US012447083B2

(12) United States Patent
Derenne et al.

(10) Patent No.: US 12,447,083 B2
(45) Date of Patent: Oct. 21, 2025

(54) PATIENT TRANSPORT APPARATUS WITH CONTROLLED AUXILIARY WHEEL SPEED

(71) Applicant: Stryker Corporation, Kalamazoo, MI (US)

(72) Inventors: Richard A. Derenne, Portage, MI (US); Gary L Bartley, Kalamazoo, MI (US); Scott A. Kuebler, Delton, MI (US); Tyler Ethen, Portage, MI (US); Matthew Aaron Whitehead, Cedar Springs, MI (US); Anish Paul, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 214 days.

(21) Appl. No.: 18/374,048

(22) Filed: Sep. 28, 2023

(65) Prior Publication Data

US 2024/0024183 A1 Jan. 25, 2024

Related U.S. Application Data

(63) Continuation of application No. 17/131,947, filed on Dec. 23, 2020, now Pat. No. 11,806,296.

(Continued)

(51) Int. Cl.

*A61G 7/10* (2006.01)
*A61G 1/02* (2006.01)

(Continued)

(52) U.S. Cl.

CPC ......... *A61G 7/1048* (2013.01); *A61G 1/0268* (2013.01); *A61G 7/0528* (2016.11);

(Continued)

(58) Field of Classification Search

CPC ...... A61G 7/08; A61G 1/0268; A61G 1/0287; A61G 1/0275; A61G 1/0225;

(Continued)

(56) References Cited

U.S. PATENT DOCUMENTS 5,348,326 A 9/1994 Fullenkamp et al.
5,552,684 A 9/1996 Wada et al.

(Continued)

FOREIGN PATENT DOCUMENTS

DE 102006032909 A1 1/2008
DE 202007008851 U1 10/2008

(Continued)

OTHER PUBLICATIONS

English language abstract and machine-assisted English translation for DE 10 2006 032 909 A1 extracted from espacenet.com database on Feb. 22, 2021, 4 pages.

(Continued)

*Primary Examiner* — Justin C Mikowski
*Assistant Examiner* — Madison Emanski
(74) *Attorney, Agent, or Firm* — Howard & Howard Attorneys PLLC

(57) ABSTRACT

A patient transport apparatus for transporting a patient over a floor surface is described herein. The patient transport apparatus includes an auxiliary wheel assembly including an auxiliary wheel, an auxiliary wheel drive system, and a control system for operating the auxiliary wheel drive system based on user commands. The control system includes a processor that is programmed to receive a user command to operate the auxiliary wheel drive system in a drive mode and responsively operate a motor control circuit to transmit power signals to a motor to rotate the auxiliary wheel. The processor is also programmed to receive a user command to operate the auxiliary wheel drive system in a free wheel mode and responsively operate the motor control circuit to enable the auxiliary wheel to rotate relatively freely with the auxiliary wheel in a deployed position.

20 Claims, 14 Drawing Sheets

Related U.S. Application Data

(60) Provisional application No. 62/954,749, filed on Dec. 30, 2019.

(51) Int. Cl.
*A61G 7/05* (2006.01)
*A61G 7/08* (2006.01)

(52) U.S. Cl.
CPC .............. *A61G 7/08* (2013.01); *A61G 1/0237* (2013.01); *A61G 1/0275* (2013.01); *A61G 7/1046* (2013.01); *A61G 2203/10* (2013.01); *A61G 2203/30* (2013.01)

(58) Field of Classification Search
CPC .... A61G 7/1046; A61G 2203/22; A61G 1/02; A61G 1/0237; A61G 7/0528; A61G 1/0567; A61G 1/0262; A61G 1/0212; A61G 7/0509; B60B 2200/242
See application file for complete search history.

(56) References Cited

U.S. PATENT DOCUMENTS 5,806,111 A 9/1998 Heimbrock et al.
5,987,671 A 11/1999 Heimbrock et al.
6,016,580 A 1/2000 Heimbrock et al.
6,178,575 B1 1/2001 Harada
6,286,165 B1 9/2001 Heimbrock et al.
6,330,926 B1 12/2001 Heimbrock et al.
6,505,359 B2 1/2003 Heimbrock et al.
6,588,523 B2 7/2003 Heimbrock et al.
6,598,247 B1 7/2003 Heimbrock et al.
6,668,402 B2 12/2003 Heimbrock
6,749,034 B2 6/2004 Vogel et al.
6,752,224 B2 6/2004 Hopper et al.
6,772,460 B2 8/2004 Heimbrock et al.
6,772,850 B1 * 8/2004 Waters ................. A61G 1/0268 280/43.23
6,792,630 B1 9/2004 Palmatier
6,877,572 B2 4/2005 Vogel et al.
6,902,019 B2 6/2005 Heimbrock et al.
7,011,172 B2 3/2006 Heimbrock et al.
7,014,000 B2 3/2006 Kummer et al.
7,083,012 B2 8/2006 Vogel et al.
7,090,041 B2 8/2006 Vogel et al.
7,195,253 B2 3/2007 Vogel et al.
7,273,115 B2 9/2007 Kummer et al.
7,284,626 B2 10/2007 Heimbrock et al.
7,302,717 B2 12/2007 Reinke et al.
7,407,024 B2 8/2008 Vogel et al.
7,419,019 B1 9/2008 White et al.
7,530,412 B2 5/2009 Heimbrock et al.
7,828,092 B2 11/2010 Vogel et al.
7,882,582 B2 2/2011 Kappeler et al.
7,886,377 B2 2/2011 Hamberg et al.
7,896,118 B2 3/2011 Williamson et al.
7,953,537 B2 5/2011 Bhai
8,024,101 B2 9/2011 Froli
8,051,931 B2 11/2011 Vogel et al.
8,109,525 B2 2/2012 Salus
8,122,535 B2 2/2012 Hensley et al.
8,240,410 B2 8/2012 Heimbrock et al.
8,260,517 B2 9/2012 Bhai
8,267,206 B2 9/2012 Vogel et al.
8,397,846 B2 3/2013 Heimbrock et al.
8,474,073 B2 7/2013 Hamberg et al.
8,746,710 B2 6/2014 Schejbal
8,756,726 B2 6/2014 Hamberg et al.
8,757,308 B2 6/2014 Bhai et al.
8,781,677 B2 7/2014 Roberts et al.
8,978,795 B2 3/2015 Block et al.
9,271,887 B2 3/2016 Schejbal
9,358,169 B2 6/2016 Ottenweller et al.
9,707,143 B2 7/2017 Thodupunuri et al.
9,931,259 B2 4/2018 Ottenweller et al.
9,937,943 B2 4/2018 Nilsson et al.
10,045,893 B2 8/2018 Childs et al.
10,799,403 B2 10/2020 Paul et al.
11,071,662 B2 7/2021 Derenne et al.
2003/0097712 A1 5/2003 Gallant et al.
2003/0159861 A1 8/2003 Hopper et al.
2005/0126835 A1 6/2005 Lenkman
2006/0059623 A1 3/2006 Karmer et al.
2007/0158921 A1 7/2007 Vogel et al.
2007/0245488 A1 10/2007 Zimbalista et al.
2009/0001740 A1 1/2009 Kofoed et al.
2010/0181122 A1 7/2010 Block et al.
2011/0087416 A1 4/2011 Patmore
2011/0277241 A1 11/2011 Schejbal
2016/0136023 A1 5/2016 Johnson et al.
2016/0137216 A1 5/2016 Nilsson et al.
2016/0143796 A1 5/2016 Jordan et al.
2016/0242978 A1 8/2016 Jurka
2016/0302985 A1 10/2016 Tessmer et al.
2018/0168897 A1 6/2018 Jonsson
2018/0185208 A1 7/2018 Jonsson et al.
2020/0155383 A1 5/2020 Derenne et al.
2021/0196548 A1 7/2021 Derenne et al.

FOREIGN PATENT DOCUMENTS

JP 2006000328 A 1/2006
WO 2005041837 A2 5/2005
WO WO-2011144186 A2 * 11/2011 ............. A61G 7/018
WO 2013054660 A1 4/2013
WO 2016196403 A1 12/2016
WO 2017001497 A1 1/2017
WO 2017151817 A1 9/2017
WO 2018210626 A1 11/2018

OTHER PUBLICATIONS

English language abstract and machine-assisted English translation for DE 20 2007 008 851 U1 extracted from espacenet.com database on Feb. 22, 2021, 10 pages.
English language abstract and machine-assisted English translation for JP 2006-000328 A extracted from espacenet.com database on Feb. 24, 2021, 21 pages.
English language abstract for WO 2013/054660 A1 and machine-assisted English translation for JP 2013-100076—equivalent of WO 2013/054660 A1—extracted from espacenet.com database on Feb. 24, 2021, 26 pages.

* cited by examiner

PATIENT TRANSPORT APPARATUS WITH CONTROLLED AUXILIARY WHEEL SPEED

CROSS-REFERENCE TO RELATED APPLICATIONS

This application is a Continuation of U.S. patent application Ser. No. 17/131,947 filed on Dec. 23, 2020, which claims priority to and all the benefits of U.S. Provisional Patent Application No. 62/954,749 filed on Dec. 30, 2019, the disclosures of each of which are hereby incorporated by reference in their entirety.

BACKGROUND

Patient transport systems facilitate care of patients in a health care setting. Patient transport systems comprise patient transport apparatuses such as, for example, hospital beds, stretchers, cots, wheelchairs, and transport chairs, to move patients between locations. A conventional patient transport apparatus comprises a base, a patient support surface, and several support wheels, such as four swiveling caster wheels. Often, the patient transport apparatus has one or more non-swiveling auxiliary wheels, in addition to the four caster wheels. The auxiliary wheel, by virtue of its non-swiveling nature, is employed to help control movement of the patient transport apparatus over a floor surface in certain situations.

DETAILED DESCRIPTION OF THE EMBODIMENTS

Figure 1:
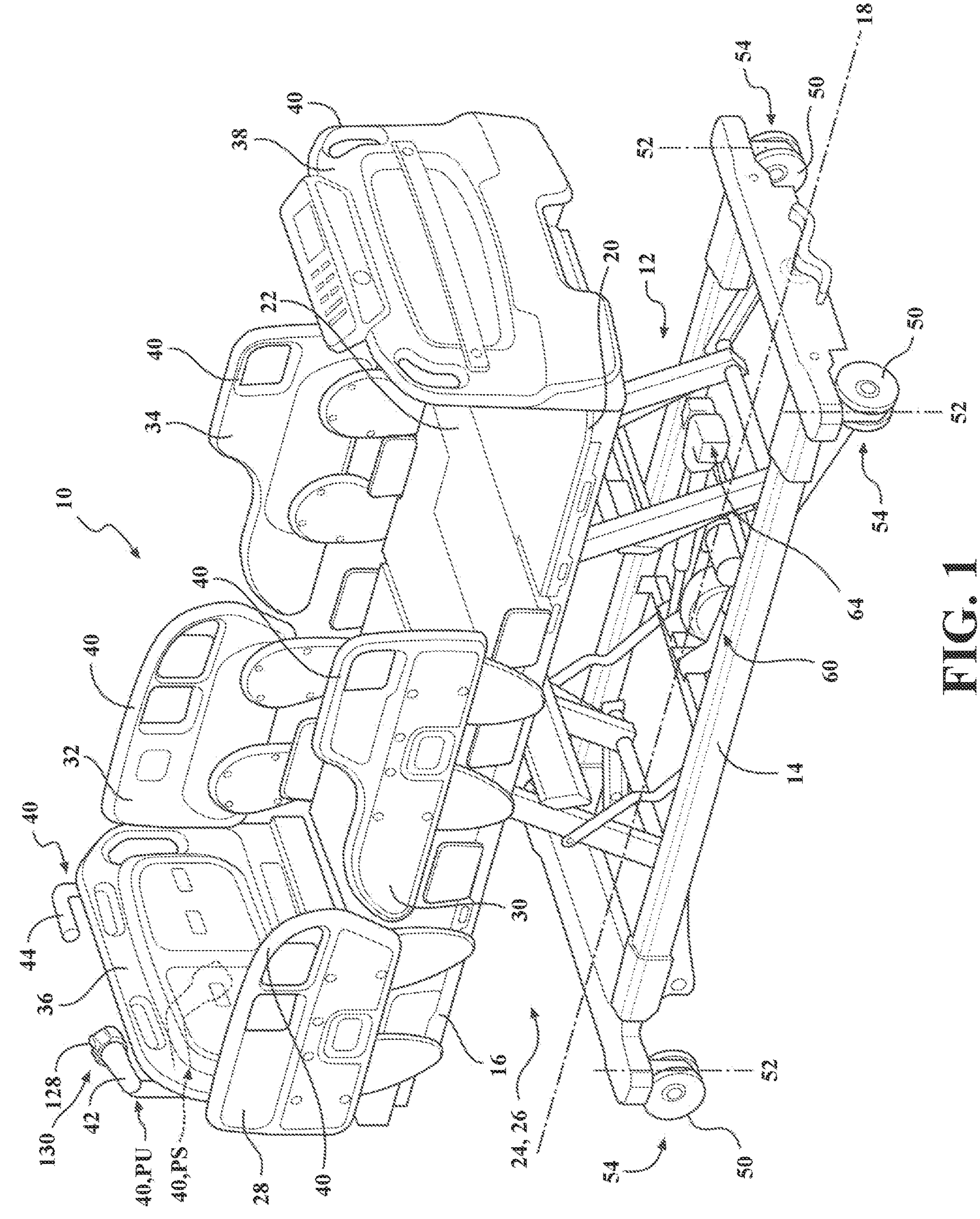
FIG. 1 is a perspective view of a patient transport apparatus, according to the present disclosure.

Referring to FIG. 1, a patient transport system comprising a patient transport apparatus 10 is shown for supporting a patient in a health care setting. The patient transport apparatus 10 illustrated in FIG. 1 comprises a hospital bed. In some embodiments, however, the patient transport apparatus 10 may comprise a stretcher, a cot, a wheelchair, or a transport chair, or similar apparatus, utilized in the care of a patient to transport the patient between locations.

A support structure 12 provides support for the patient. The support structure 12 illustrated in FIG. 1 comprises a base 14 and an intermediate frame 16. The base 14 defines a longitudinal axis 18 from a head end to a foot end. The intermediate frame 16 is spaced above the base 14. The support structure 12 also comprises a patient support deck 20 disposed on the intermediate frame 16. The patient support deck 20 comprises several sections, some of which articulate (e.g., pivot) relative to the intermediate frame 16, such as a fowler section, a seat section, a thigh section, and a foot section. The patient support deck 20 provides a patient support surface 22 upon which the patient is supported.

In certain embodiments, such as is depicted in FIG. 1, the patient transport apparatus 10 further comprises a lift assembly, generally indicated at 24, which operates to lift and lower the intermediate frame 16 relative to the base 14. The lift assembly 24 is configured to move the intermediate frame 16 between a plurality of vertical configurations relative to the base 14 (e.g., between a minimum height and a maximum height, or to any desired position in between). To this end, the lift assembly 24 comprises one or more bed lift actuators 26 which are arranged to facilitate movement of the intermediate frame 16 with respect to the base 14. The bed lift actuators 26 may be realized as linear actuators, rotary actuators, or other types of actuators, and may be electrically operated, hydraulic, electro-hydraulic, or the like. It is contemplated that, in some embodiments, separate lift actuators could be disposed to facilitate independently lifting the head and foot ends of the intermediate frame 16 and, in some embodiments, only one lift actuator may be employed, (e.g., to raise only one end of the intermediate frame 16). The construction of the lift assembly 24 and/or the bed lift actuators 26 may take on any known or conventional design, and is not limited to that specifically illustrated. One exemplary lift assembly that can be utilized on the patient transport apparatus 10 is described in U.S. Patent Application Publication No. 2016/0302985, entitled "Patient Support Lift Assembly", which is hereby incorporated herein by reference in its entirety.

A mattress, although not shown, may be disposed on the patient support deck 20. The mattress comprises a secondary patient support surface upon which the patient is supported. The base 14, intermediate frame 16, patient support deck 20, and patient support surface 22 each have a head end and a foot end corresponding to designated placement of the patient's head and feet on the patient transport apparatus 10. The construction of the support structure 12 may take on any known or conventional design, and is not limited to that specifically set forth above. In addition, the mattress may be omitted in certain embodiments, such that the patient rests directly on the patient support surface 22.

Side rails 28, 30, 32, 34 are supported by the base 14. A first side rail 28 is positioned at a right head end of the intermediate frame 16. A second side rail 30 is positioned at a right foot end of the intermediate frame 16. A third side rail 32 is positioned at a left head end of the intermediate frame 16. A fourth side rail 34 is positioned at a left foot end of the intermediate frame 16. If the patient transport apparatus 10 is a stretcher, there may be fewer side rails. The side rails 28, 30, 32, 34 are movable between a raised position in which they block ingress and egress into and out of the patient transport apparatus 10 and a lowered position in which they are not an obstacle to such ingress and egress. The side rails 28, 30, 32, 34 may also be movable to one or more intermediate positions between the raised position and the lowered position. In still other configurations, the patient transport apparatus 10 may not comprise any side rails.

A headboard 36 and a footboard 38 are coupled to the intermediate frame 16. In some embodiments, when the headboard 36 and footboard 38 are provided, the headboard 36 and footboard 38 may be coupled to other locations on the patient transport apparatus 10, such as the base 14. In still other embodiments, the patient transport apparatus 10 does not comprise the headboard 36 and/or the footboard 38.

User interfaces 40, such as handles, are shown integrated into the footboard 38 and side rails 28, 30, 32, 34 to facilitate movement of the patient transport apparatus 10 over floor surfaces. Additional user interfaces 40 may be integrated into the headboard 36 and/or other components of the patient transport apparatus 10. The user interfaces 40 are graspable by the user to manipulate the patient transport apparatus 10 for movement.

Other forms of the user interface 40 are also contemplated. The user interface may simply be a surface on the patient transport apparatus 10 upon which the user logically applies force to cause movement of the patient transport apparatus 10 in one or more directions, also referred to as a push location. This may comprise one or more surfaces on the intermediate frame 16 or base 14. This could also comprise one or more surfaces on or adjacent to the headboard 36, footboard 38, and/or side rails 28, 30, 32, 34.

In the embodiment shown in FIG. 1, one set of user interfaces 40 comprises a first handle 42 and a second handle 44. The first and second handles 42, 44 are coupled to the intermediate frame 16 proximal to the head end of the intermediate frame 16 and on opposite sides of the intermediate frame 16 so that the user may grasp the first handle 42 with one hand and the second handle 44 with the other. As is described in greater detail below in connection with FIGS. 1 and 6, in some embodiments the first handle 42 comprises an inner support 46 defining a central axis C, and handle body 48 configured to be gripped by the user. In some embodiments, the first and second handles 42, 44 are coupled to the headboard 36. In still other embodiments the first and second handles 42, 44 are coupled to another location permitting the user to grasp the first and second handle 42, 44. As shown in FIG. 1, one or more of the user interfaces (e.g., the first and second handles 42, 44) may be arranged for movement relative to the intermediate frame 16, or another part of the patient transport apparatus 10, between a use position PU arranged for engagement by the user, and a stow position PS (depicted in phantom), with movement between the use position PU and the stow position PS being facilitated such as by a hinged or pivoting connection to the intermediate frame 16 (not shown in detail). Other configurations are contemplated.

Support wheels 50 are coupled to the base 14 to support the base 14 on a floor surface such as a hospital floor. The support wheels 50 allow the patient transport apparatus 10 to move in any direction along the floor surface by swiveling to assume a trailing orientation relative to a desired direction of movement. In the embodiment shown, the support wheels 50 comprise four support wheels each arranged in corners of the base 14. The support wheels 50 shown are caster wheels able to rotate and swivel about swivel axes 52 during transport. Each of the support wheels 50 forms part of a caster assembly 54. Each caster assembly 54 is mounted to the base 14. It should be understood that various configurations of the caster assemblies 54 are contemplated. In addition, in some embodiments, the support wheels 50 are not caster wheels and may be non-steerable, steerable, non-powered, powered, or combinations thereof. Additional support wheels 50 are also contemplated.

In some embodiments, the patient transport apparatus 10 comprises a support wheel brake actuator 56 (shown schematically in FIG. 8) operably coupled to one or more of the support wheels 50 for braking one or more support wheels 50. In some embodiments, the support wheel brake actuator 56 may comprise a brake member 58 coupled to the base 14 and movable between a braked position engaging one or more of the support wheels 50 to brake the support wheel 50 and a released position permitting one or more of the support wheels 50 to rotate freely.

Figure 2:
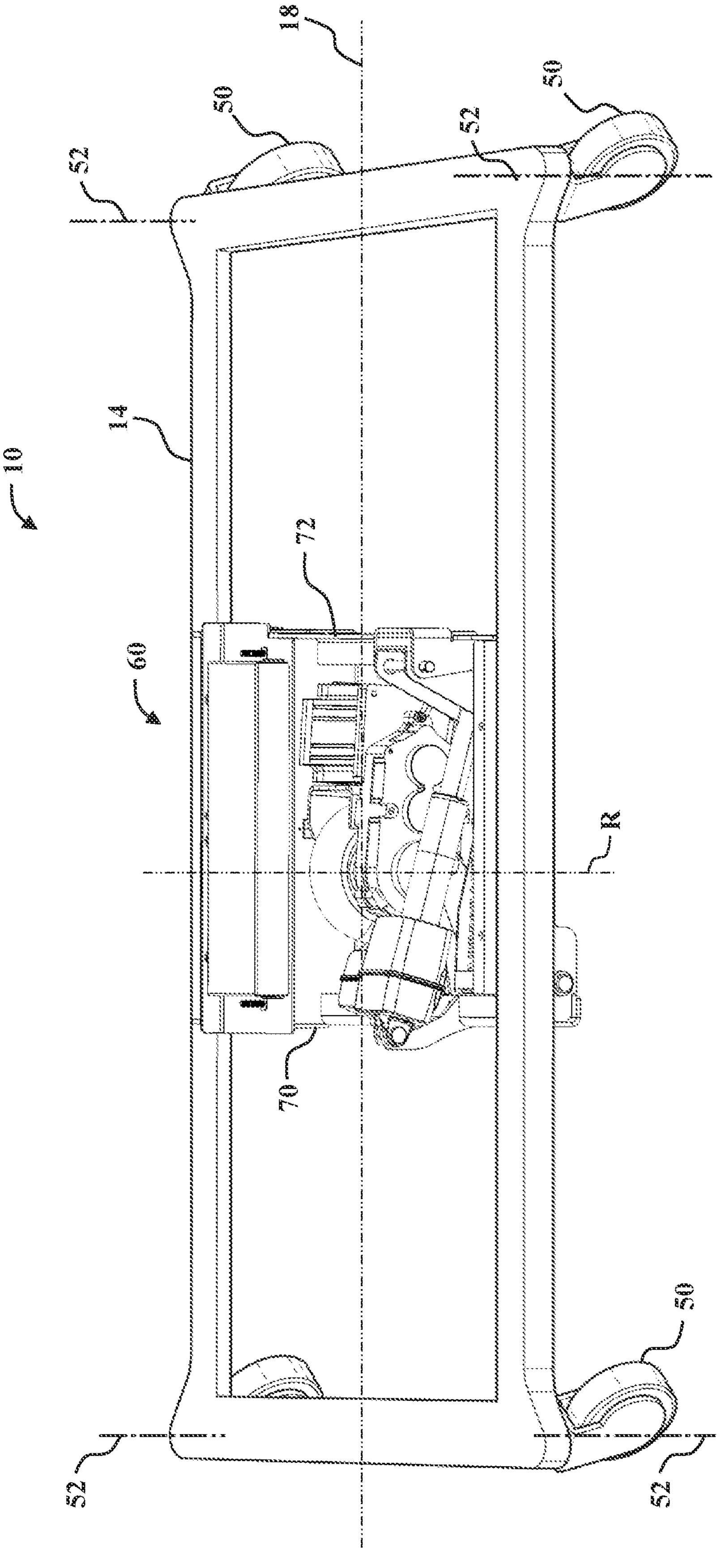
FIG. 2 is a perspective view of an auxiliary wheel assembly of the patient transport apparatus coupled to a base of the patient transport apparatus shown in FIG. 1.
Figure 3:
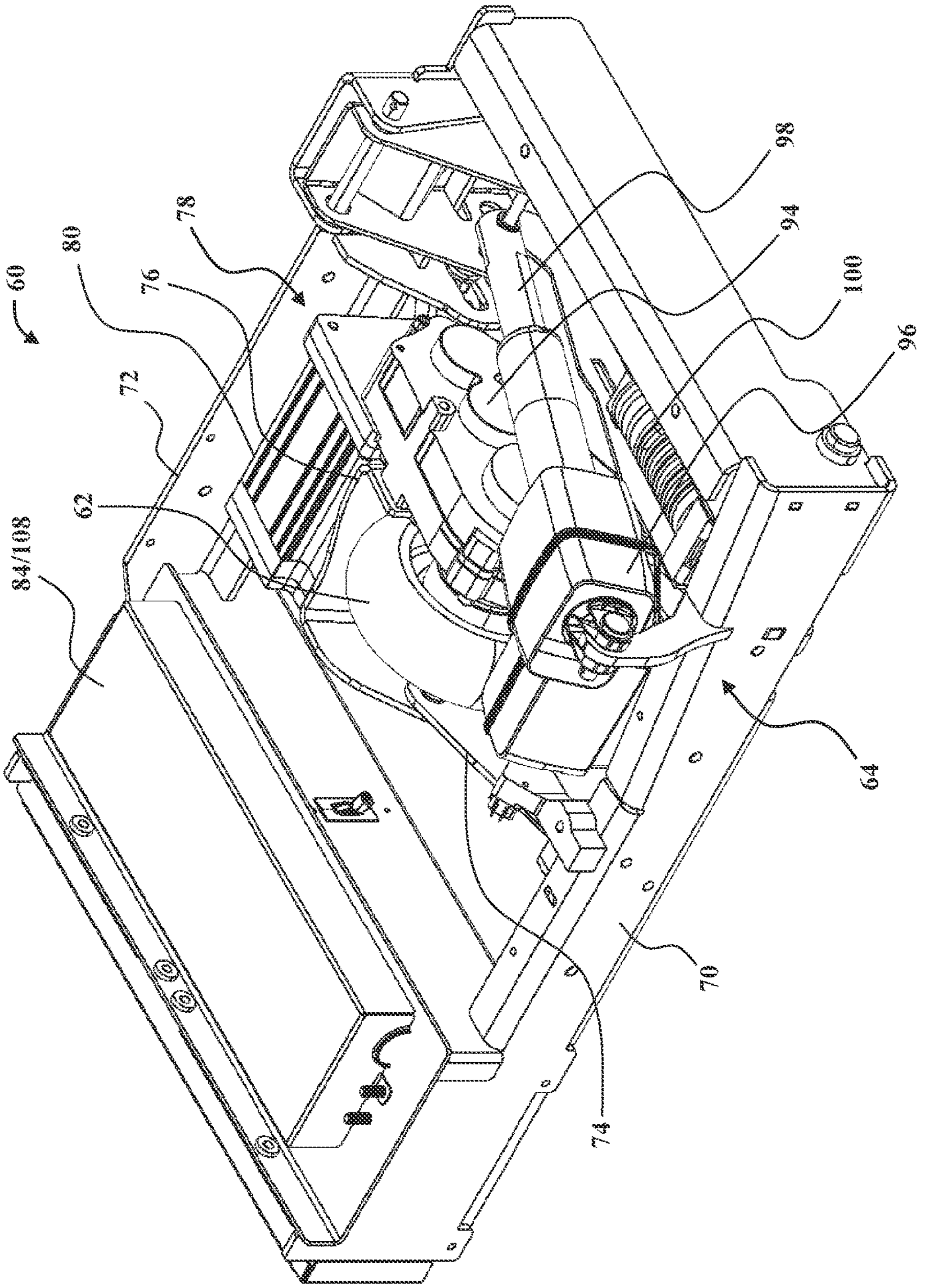
FIG. 3 is a perspective view of the auxiliary wheel assembly shown in FIG. 2.
Figure 4:
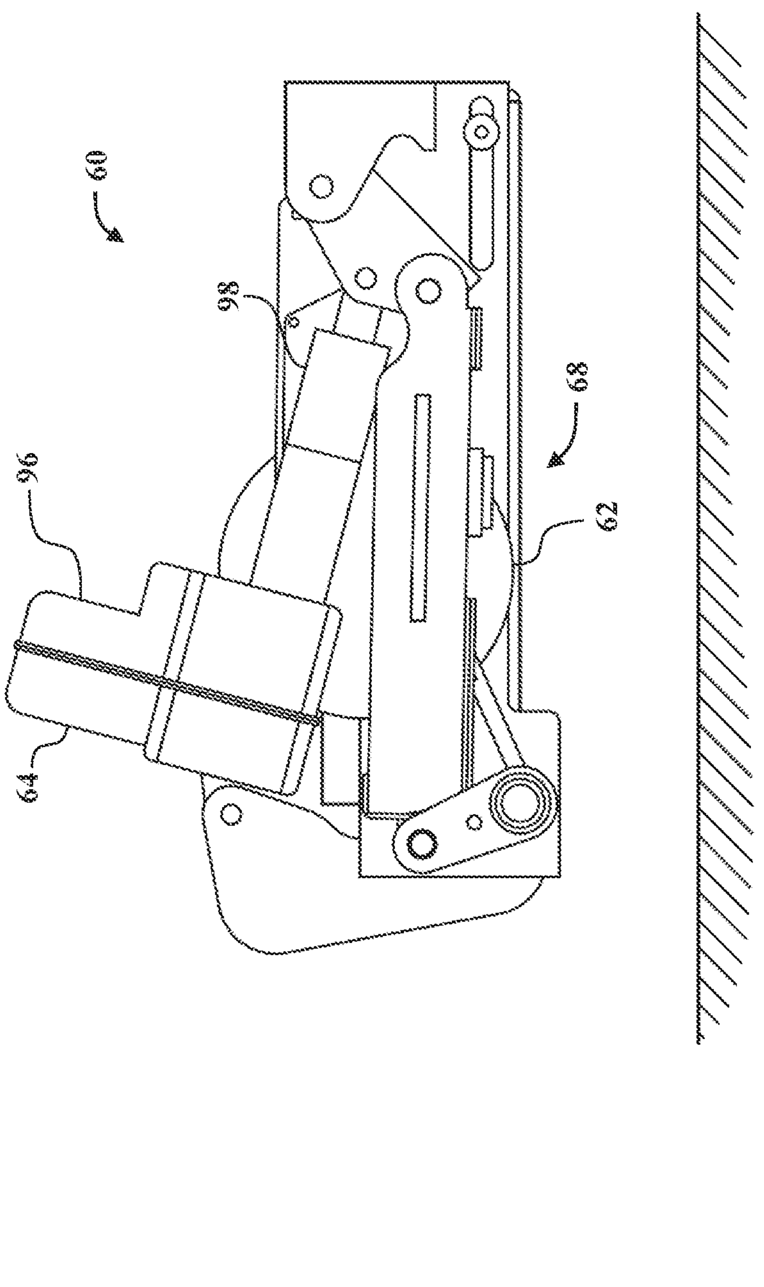
FIG. 4 is an elevational view of the auxiliary wheel assembly shown in FIG. 2 in a retracted position.

Referring to FIGS. 1-3, an auxiliary wheel assembly 60 is coupled to the base 14. The auxiliary wheel assembly 60 influences motion of the patient transport apparatus 10 during transportation over the floor surface. The auxiliary wheel assembly 60 comprises an auxiliary wheel 62 and an auxiliary wheel actuator 64 operatively coupled to the auxiliary wheel 62. The auxiliary wheel actuator 64 is operable to move the auxiliary wheel 62 between a deployed position 66 (see FIG. 5) engaging the floor surface and a retracted position 68 (see FIG. 4) spaced away from and out of contact with the floor surface. The retracted position 68 may alternatively be referred to as the “fully retracted position.” The auxiliary wheel 62 may also be positioned in one or more intermediate positions between the deployed position 66 (see FIG. 5) and the retracted position 68 (FIG. 4). The intermediate positions may alternatively be referred to as a “partially retracted position,” or may also refer to another “retracted position” (e.g., compared to the “fully” retracted position 68 depicted in FIG. 4). The auxiliary wheel 62 influences motion of the patient transport apparatus 10 during transportation over the floor surface when the auxiliary wheel 62 is in the deployed position 66. In some embodiments, the auxiliary wheel assembly 60 comprises an additional auxiliary wheel movable with the auxiliary wheel 62 between the deployed position 66 and the retracted position 68 via the auxiliary wheel actuator 64.

By deploying the auxiliary wheel 62 on the floor surface, the patient transport apparatus 10 can be easily moved down long, straight hallways or around corners, owing to a non-swiveling nature of the auxiliary wheel 62. When the auxiliary wheel 62 is in the retracted position 68 (see FIG. 4) or in one of the intermediate positions (e.g. spaced from the floor surface), the patient transport apparatus 10 may be subject to moving in an undesired direction due to uncontrollable swiveling of the support wheels 50. For instance, during movement down long, straight hallways, the patient transport apparatus 10 may be susceptible to “dog tracking,” which refers to undesirable sideways movement of the patient transport apparatus 10. Additionally, when cornering, without the auxiliary wheel 62 deployed, and with all of the support wheels 50 able to swivel, there is no wheel assisting with steering through the corner, unless one or more of the support wheels 50 are provided with steer lock capability and the steer lock is activated.

The auxiliary wheel 62 may be arranged parallel to the longitudinal axis 18 of the base 14. The differently, the auxiliary wheel 62 rotates about a rotational axis R (see FIG. 2) oriented perpendicularly to the longitudinal axis 18 of the base 14 (albeit offset in some cases from the longitudinal axis 18). In the embodiment shown, the auxiliary wheel 62 is incapable of swiveling about a swivel axis. In some embodiments, the auxiliary wheel 62 may be capable of swiveling, but can be locked in a steer lock position in which the auxiliary wheel 62 is locked to solely rotate about the rotational axis R oriented perpendicularly to the longitudinal axis 18. In still other embodiments, the auxiliary wheel 62 may be able to freely swivel without any steer lock functionality or may be steered.

The auxiliary wheel 62 may be located to be deployed inside a perimeter of the base 14 and/or within a support wheel perimeter defined by the swivel axes 52 of the support wheels 50. In some embodiments, such as those employing a single auxiliary wheel 62, the auxiliary wheel 62 may be located near a center of the support wheel perimeter, or may be offset from the center. In this case, the auxiliary wheel 62 may also be referred to as a fifth wheel. In some embodiments, the auxiliary wheel 62 may be disposed along the support wheel perimeter or outside of the support wheel perimeter. In the embodiment shown, the auxiliary wheel 62 has a diameter larger than a diameter of the support wheels 50. In some embodiments, the auxiliary wheel 62 may have the same or a smaller diameter than the support wheels 50.

In the embodiment shown in FIG. 3, the base 14 comprises a first cross-member and a second cross-member 72. The auxiliary wheel assembly 60 is disposed between and coupled to the cross-members 70, 72. The auxiliary wheel assembly 60 comprises a first auxiliary wheel frame 74 coupled to and arranged to articulate (e.g. pivot) relative to the first cross-member 70. The auxiliary wheel assembly 60 further comprises a second auxiliary wheel frame 76 pivotably coupled to the first auxiliary wheel frame 74 and the second cross-member 72. The second auxiliary wheel frame 76 is arranged to articulate and translate relative to the second cross-member 72.

Figure 9:
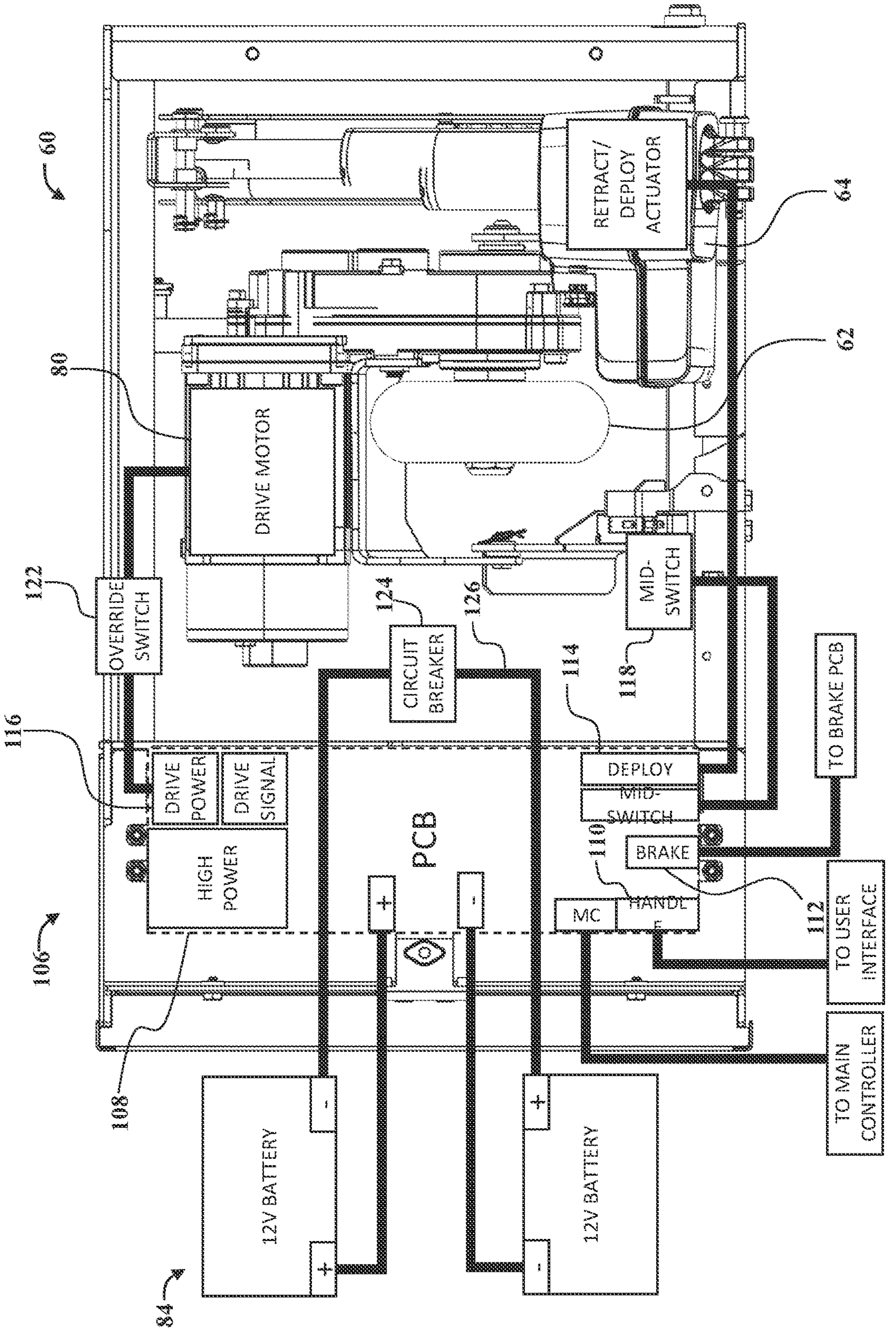
FIG. 9 is a schematic wire diagram of an auxiliary wheel assembly control circuit that may be used with the auxiliary wheel assembly shown in FIG. 1.
Figure 10:
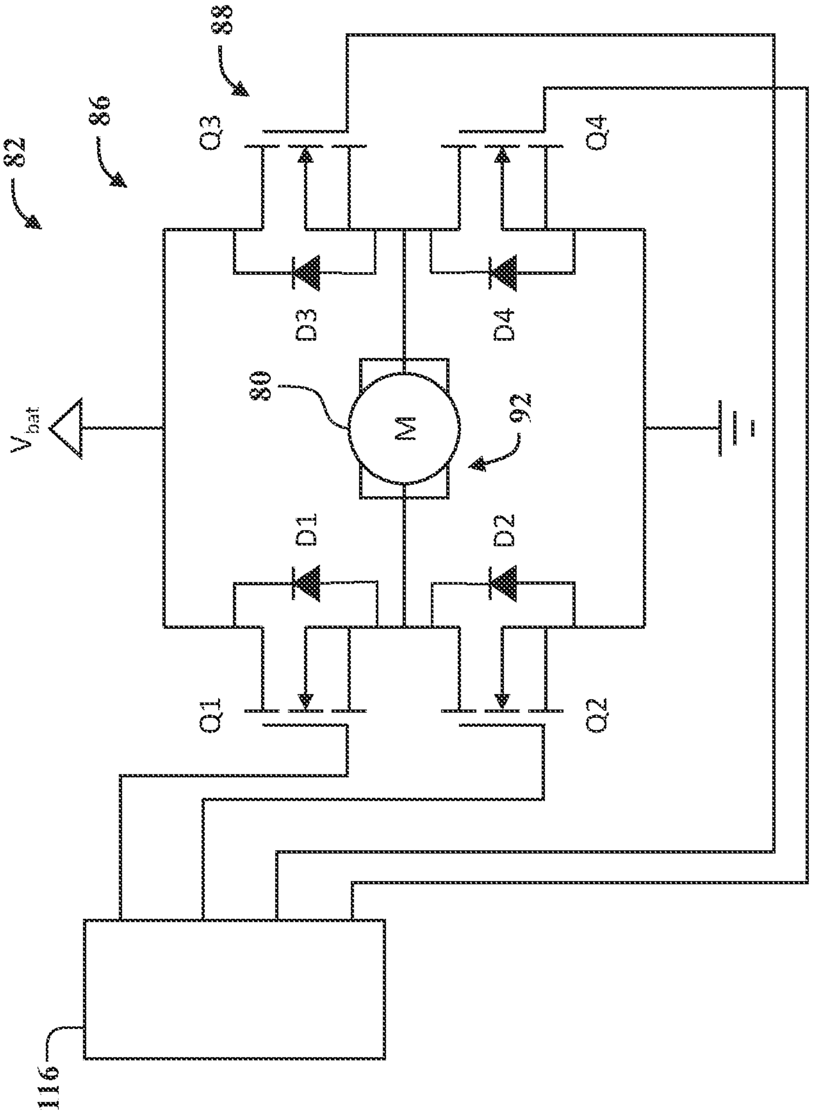
FIG. 10 is a schematic wire diagram of a motor control circuit that may be used with the auxiliary wheel assembly shown in FIG. 1.

In the embodiment shown in FIGS. 2-3, the auxiliary wheel assembly 60 comprises an auxiliary wheel drive system 78 (described in more detail below) operatively coupled to the auxiliary wheel 62. The auxiliary wheel drive system 78 is configured to drive (e.g. rotate) the auxiliary wheel 62. In the embodiment shown, the auxiliary wheel drive system 78 comprises a motor 80 that is coupled to the auxiliary wheel 62 for rotating the auxiliary wheel 62 relative to the support structure and a motor control circuit 82 (shown in FIGS. 9 and 10) that is configured to transmit various control and power signals to the motor 80. The motor control circuit 82 is also coupled to a power source 84 (shown schematically in FIG. 9) for use in generating the control and power signals that are used to operate the motor 80. In the embodiment shown, the motor control circuit 82 includes a motor bridge circuit 86 that includes a plurality of field-effect transistor (FET) switches 88 (e.g. Q1, Q2, Q3, Q4 shown in FIG. 10) that are coupled to motor leads 92 of the motor 80. In some embodiments, the motor 80 is realized as a 3-phase BLDC motor. In some embodiments, any suitable motor may be used with auxiliary wheel drive system 78 without departing from the scope of the present disclosure.

The auxiliary wheel drive system 78 also includes a gear train 94 that is coupled to the motor 80 and an axle of the auxiliary wheel 62. In the embodiment shown, the auxiliary wheel 62, the gear train 94, and the motor 80 are arranged and supported by the second auxiliary wheel frame 76 to articulate and translate with the second auxiliary wheel frame 76 relative to the second cross-member 72. In some embodiments, the axle of the auxiliary wheel 62 is coupled directly to the second auxiliary wheel frame 76 and the auxiliary wheel drive system 78 drives the auxiliary wheel 62 in another manner. Electrical power is provided from the power source 84 to energize the motor 80. The motor 80 converts electrical power from the power source 84 to torque supplied to the gear train 94. The gear train 94 transfers torque to the auxiliary wheel 62 to rotate the auxiliary wheel 62.

In the embodiment shown, the auxiliary wheel actuator 64 is a linear actuator comprising a housing 96 and a drive rod 98 extending from the housing 96. The drive rod 98 has a proximal end received in the housing 96 and a distal end spaced from the housing 96. The distal end of the drive rod 98 is configured to be movable relative to the housing 96 to extend and retract an overall length of the auxiliary wheel actuator 64. In the embodiment shown, the auxiliary wheel assembly 60 also comprises a biasing device such as a spring cartridge 100 to apply a biasing force. Operation of the auxiliary wheel actuator 64 and the spring cartridge 100 to retract/deploy the auxiliary wheel 62 is described in U.S. patent application Ser. No. 16/690,217, filed on Nov. 21, 2019, entitled, "Patient Transport Apparatus With Controlled Auxiliary Wheel Deployment," which is hereby incorporated herein by reference.

Figure 5:
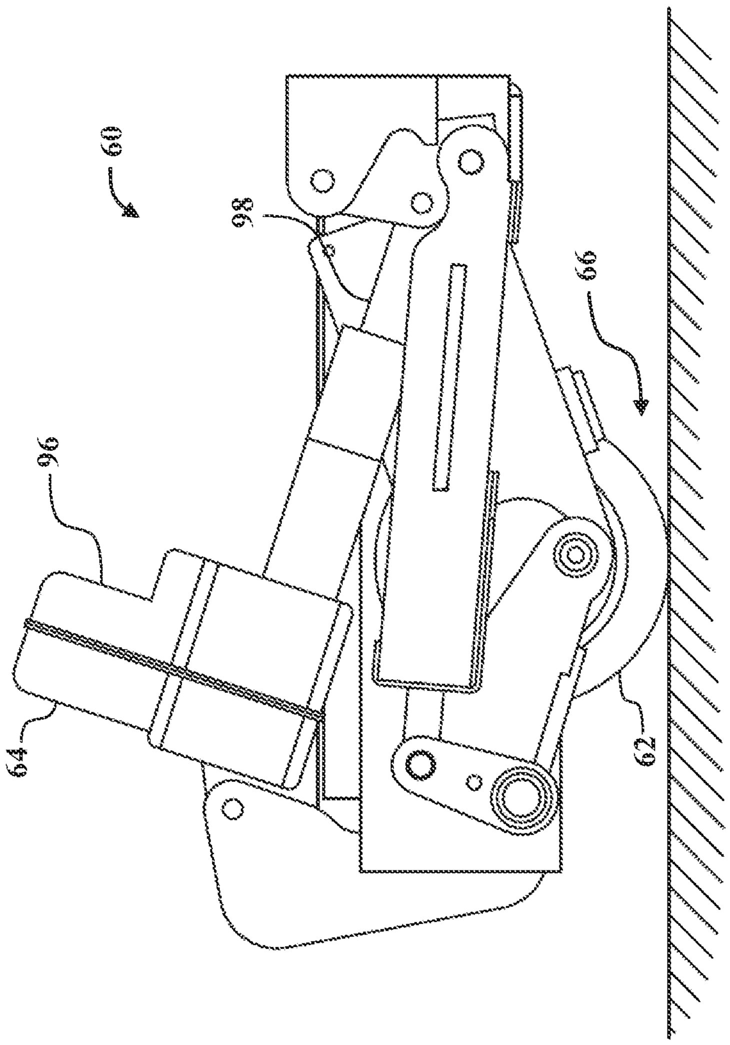
FIG. 5 is an elevational view of the auxiliary wheel assembly shown in FIG. 2 in a deployed position.

Referring to FIGS. 4 and 5, when moving to the retracted position 68, auxiliary wheel actuator 64 retracts the drive rod 98 into the housing 96 to move the auxiliary wheel 62 from the deployed position 66 to the retracted position 68. When moving to the deployed position 66, auxiliary wheel actuator 64 extends the drive rod 98 from the housing 96 to move the auxiliary wheel 62 from the retracted position 68 to the deployed position 66. Various linkages are contemplated for such movement, including those disclosed in U.S. patent application Ser. No. 16/690,217, filed on Nov. 21, 2019, entitled, "Patient Transport Apparatus With Controlled Auxiliary Wheel Deployment," which is incorporated herein by reference. In some versions, the housing 96 of the auxiliary wheel actuator 64 may be fixed to the cross member 70 and directly connected to the auxiliary wheel 62 to directly retract/deploy the auxiliary wheel 62. Other configurations are also contemplated.

In some embodiments, the auxiliary wheel assembly 60 comprises an auxiliary wheel brake actuator 102 (shown schematically in FIG. 8) operably coupled to the auxiliary wheel 62 for braking the auxiliary wheel 62. The auxiliary wheel brake actuator 102 may comprise a brake member 104 coupled to the base 14 and movable between a braked position engaging the auxiliary wheel 62 to brake the auxiliary wheel 62 and a released position permitting the auxiliary wheel 62 to rotate.

In the embodiment shown, the auxiliary wheel assembly 60 includes an auxiliary wheel assembly control circuit 106 (see FIGS. 9 and 10) that is coupled to the auxiliary wheel actuator 64, the auxiliary wheel drive system 78, the auxiliary wheel brake actuator 102, and a power supply 84 for controlling operation of the auxiliary wheel assembly 60. In some embodiments, the power supply 84 may include a pair of rechargeable 12-volt batteries for providing electrical power to the auxiliary wheel assembly 60. In some embodiments, the power supply 84 may include one or more batteries that may be rechargeable and/or non-rechargeable and may be rated for use at voltages other than 12-volts. In some embodiments, as shown in FIG. 9, the auxiliary wheel assembly control circuit 106 includes a printed circuit board 108 mounted to the base 14 and having a user interface control unit 110, a brake control unit 112, an auxiliary wheel actuator control unit 114, and an auxiliary wheel control unit 116 mounted thereon. The auxiliary wheel assembly control circuit 106 may also include one or more auxiliary wheel position sensors 118, one or more auxiliary wheel speed sensors 120 (shown in FIG. 8), an override switch 122 operable to disconnect power to the motor 80, and a circuit breaker 124 coupled to the power supply 84.

In some embodiments, the auxiliary wheel assembly control circuit 106 includes an electrical current sense circuit 126 that is configured to sense the electrical current drawn by the motor 80 from the power supply 84. The electrical current sense circuit 126 may also be configured to sense an electrical current through motor phase windings of the motor 80. In addition, the electrical current sense circuit 126 may be configured to sense the electrical current drawn by the auxiliary wheel brake actuator 102.

The user interface control unit 110 is configured to transmit and receive instructions from the user interface 40 to enable a user to operate the auxiliary wheel assembly 60 with the user interface 40. The auxiliary wheel control unit 116 is configured to control the operation of the auxiliary wheel drive system 78 based on signals received from the user interface 40 via the user interface control unit 110. The brake control unit 112 is configured to operate the auxiliary wheel brake actuator 102 for braking the auxiliary wheel 62. The auxiliary wheel actuator control unit 114 is configured to operate the auxiliary wheel actuator 64 to move the auxiliary wheel 62 between the deployed and retracted positions. The auxiliary wheel position sensor 118 is configured to sense a position of the auxiliary wheel actuator 64. In some embodiments, the auxiliary wheel position sensor 118 may include a mid-switch that is configured to detect a position of the auxiliary wheel 62 in the deployed position 66, the retracted position 68, and any intermediate position between the deployed position 66 and the retracted position 68. In some embodiments, the auxiliary wheel position switch 118 may be configured to read off a cam surface (not shown) and indicates when the auxiliary wheel 62 is in a specific position between fully deployed and fully retracted. In some versions, two or more limit switches, optical sensors, hall-effect sensors, or other types of sensors may be used to detect the current position of the auxiliary wheel 62.

The auxiliary wheel speed sensor 120 is configured to sense a rotational speed of the auxiliary wheel. In some embodiments, the auxiliary wheel speed sensor 120 may include one or more hall effect devices that are configured to sense rotation of the motor 80 (e.g., the motor shaft). The auxiliary wheel speed sensor 120 may also be used to detect a rotation of the auxiliary wheel 62 for use in determining whether the auxiliary wheel 62 is in a stop position and is not rotating. The auxiliary wheel speed sensor 120 may also be any other suitable sensor for measuring wheel speed, such as an optical encoder.

The override switch 122 is configured to disconnect power to the drive motor 80 to enable the auxiliary wheel 62 to rotate more freely. It should be appreciated that in some embodiments, such as that shown in FIG. 9, when power to the drive motor 80 is disconnected, frictional forces may still be present between the drive motor 80 and auxiliary wheel 62 by virtue of the gear train 94 such that rotation of the auxiliary wheel 62 is at least partially inhibited by the gear train 94. Depending on the nature of the gear train 94, the torque required to overcome such frictional forces vary. In some versions, the gear train 94 may be selected to minimize the torque required to manually drive the auxiliary wheel 62. In some versions, a clutch may be employed between the auxiliary wheel 62 and the gear train 94 that is operated to disconnect the gear train 94 from the auxiliary wheel 62 when the override switch 122 is activated. In some versions, the drive motor 80 may directly drive the auxiliary wheel 62 (e.g., without a gear train), in which case, the auxiliary wheel 62 may rotate freely when power to the drive motor 80 is disconnected. If the auxiliary wheel 62 remains stuck in the deployed position or an intermediate position, the auxiliary wheel assembly control circuit 106 may operate the override switch 122 to disconnect power to the drive motor 80 and allow the auxiliary wheel 62 to rotate more freely. The circuit breaker 124 is configured to trip if an accidental electrical current spike is detected. In addition, the circuit breaker 124 may be switched to an "off" position to disconnect the power supply 84 to save battery life for storage and shipping.

Although exemplary embodiments of an auxiliary wheel assembly 60 is described above and shown in the drawings, it should be appreciated that other configurations employing an auxiliary wheel actuator 64 to move the auxiliary wheel 62 between the retracted position 68 and deployed position 66 are contemplated.

Figure 6:
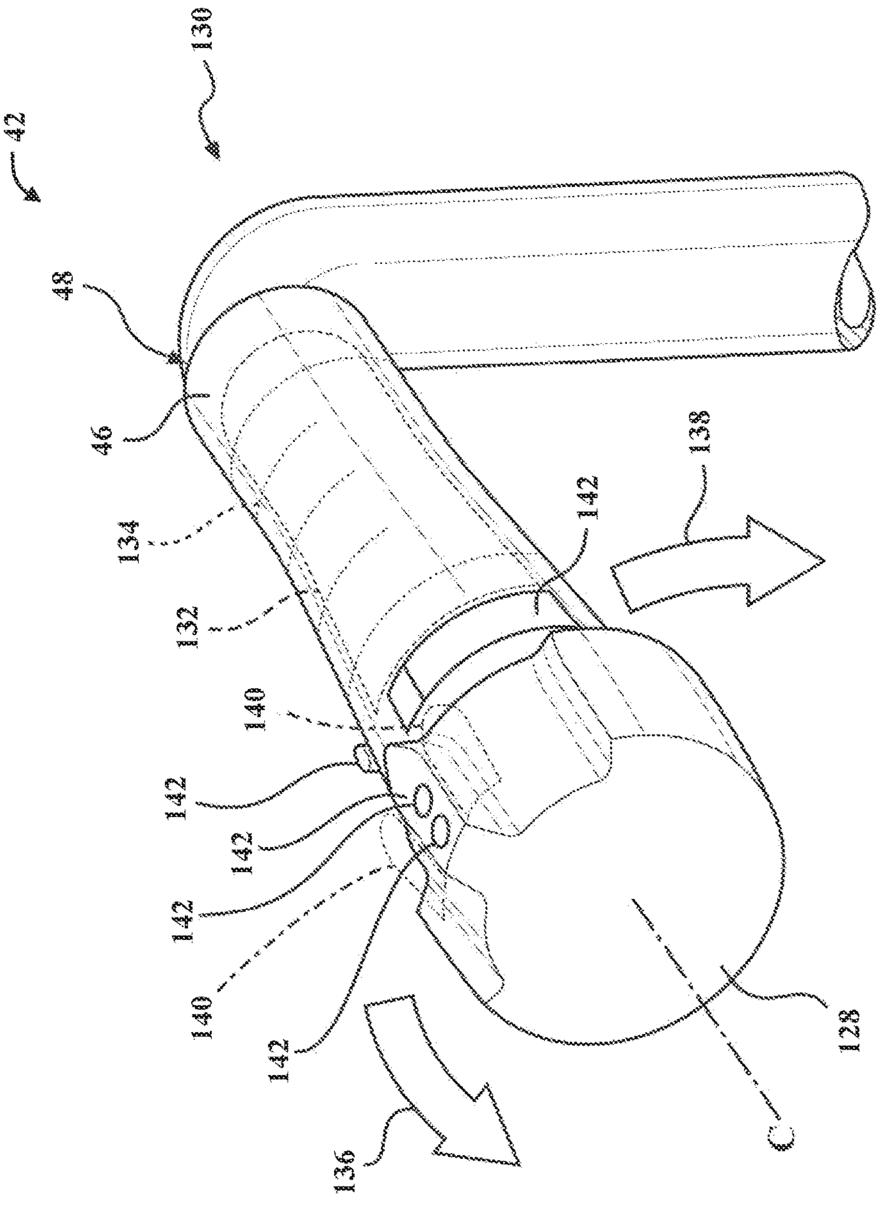
FIG. 6 is a perspective view of a handle and a throttle assembly that may be used with the patient transport apparatus shown in FIG. 1.

In the embodiment shown in FIG. 6, the auxiliary wheel drive system 78 is configured to drive (e.g. rotate) the auxiliary wheel 62 in response to a throttle 128 operable by the user. As is described in greater detail below in connection with FIGS. 6-7F, the throttle 128 is operatively attached to the first handle 42 in the illustrated embodiment to define a throttle assembly 130.

Figures 7A, 7B, 7C, 7D, 7E, 7F:
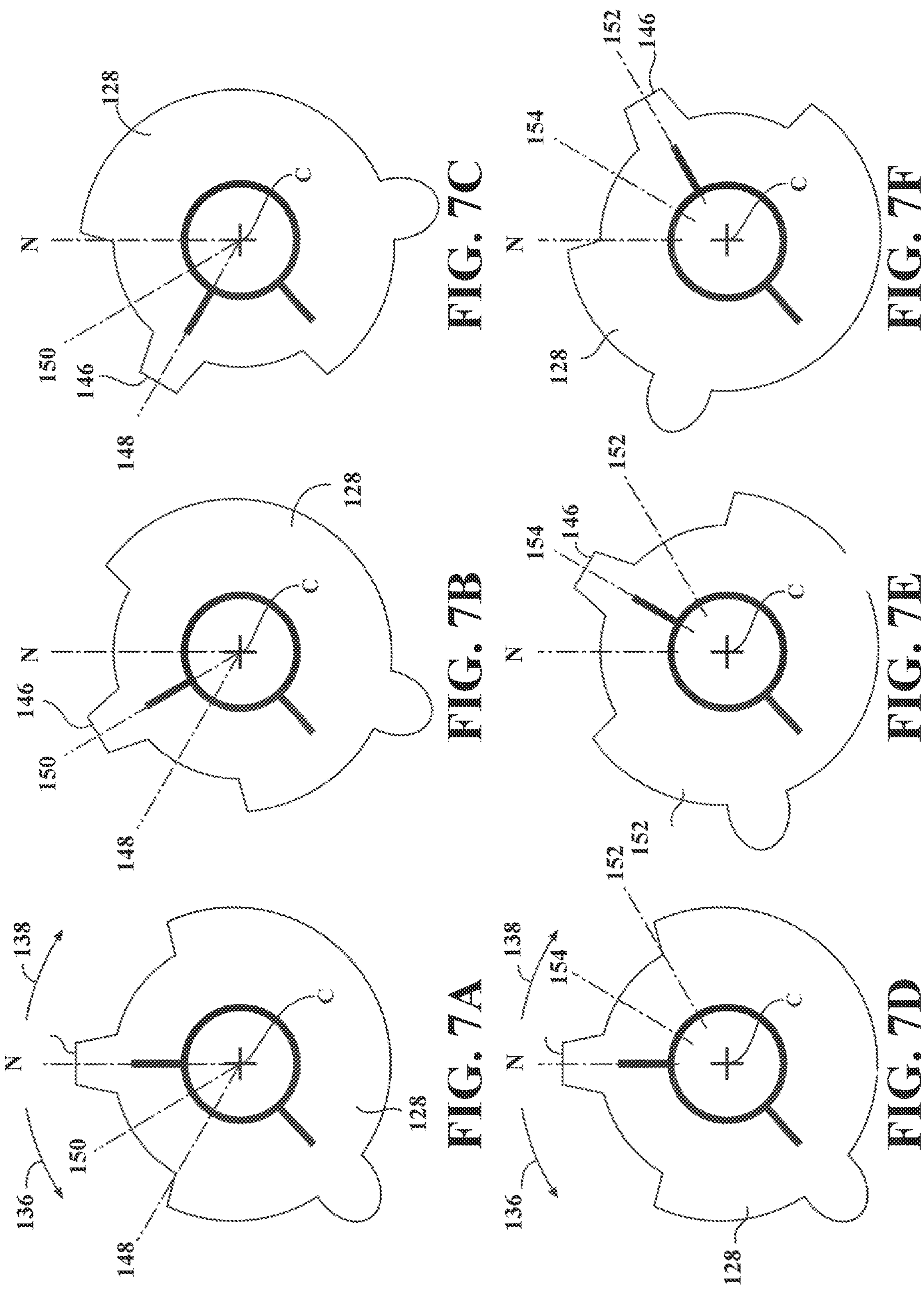
FIG. 7A is an elevational view of a first position of a throttle of the throttle assembly relative to the handle.
FIG. 7B is an elevational view of a second position of the throttle relative to the handle.
FIG. 7C is an elevational view of a third position of the throttle relative to the handle.
FIG. 7D is another elevational view of the first position of the throttle relative to the handle.
FIG. 7E is an elevational view of a fourth position of the throttle relative to the handle.
FIG. 7F is an elevational view of a fifth position of the throttle relative to the handle.

In some embodiments, such as those shown in FIGS. 6-7F, one or more user interface sensors 132 (e.g., capacitive sensors or the like) are coupled to the first handle 42 to determine engagement by the user and generate a signal responsive to touch (e.g. hand placement/contact) of the user. The one or more user interface sensors 132 are operatively coupled to the auxiliary wheel actuator 64 to control movement of the auxiliary wheel 62 between the deployed position 66 and the retracted position 68. Operation of the auxiliary wheel actuator 64 in response to the user interface sensor 132 is described in more detail below. In some embodiments, the user interface sensor 132 is coupled to another portion of the patient transport apparatus 10, such as another user interface 40.

In some embodiments, such as is depicted in FIG. 6, engagement features or indicia 134 are located on the first handle 42 to indicate to the user where the user's hands may be placed on a particular portion of the first handle 42 for the user interface sensor 132 to generate the signal indicating engagement by the user. For instance, the first handle 42 may comprise embossed or indented features to indicate where the user's hand should be placed. In some embodiments, the indicia 134 comprises a film, cover, or ink disposed at least partially over the first handle 42 and shaped like a handprint to suggest the user's hand should match up with the handprint for the user interface sensor 132 to generate the signal. In still other embodiments, the shape of the user interface sensor 132 acts as the indicia 134 to indicate where the user's hand should be placed for the user interface sensor 132 to generate the signal. In some embodiments (not shown), the patient transport apparatus 10 does not comprise a user interface sensor 132 operatively coupled to the auxiliary wheel actuator 64 for moving the auxiliary wheel 62 between the deployed position 66 and the retracted position 68. Instead, a user input device is operatively coupled to the auxiliary wheel actuator 64 for the user to selectively move the auxiliary wheel 62 between the deployed position 66 and the retracted position 68. In some embodiments, both the user interface sensor 132 and the user input device are employed.

Referring now to FIGS. 7A-7F, the throttle 128 is illustrated in various positions. In FIGS. 7A and 7D, the throttle is in a neutral throttle position N. The throttle 128 is movable in a first direction 136 (also referred to as a "forward direction") relative to the neutral throttle position N and a second direction 138 (also referred to as a "backward direction") relative to the neutral throttle position N opposite the first direction 136. As will be appreciated from the subsequent description below, the auxiliary wheel drive system 78 drives the auxiliary wheel 62 in a forward direction when the throttle 128 is moved in the first direction 136, and in a rearward direction opposite the forward direction when the throttle 128 is moved in the second direction 138. When the throttle 128 is disposed in the neutral throttle position N, as shown in FIG. 7A (see also FIG. 7D), the auxiliary wheel drive system 78 does not drive the auxiliary wheel 62 in either direction. In many embodiments, the throttle 128 is spring-biased to the neutral throttle position N.

As is described in greater detail below, when the throttle 128 is in the neutral throttle position N, the auxiliary wheel drive system 78 may permit the auxiliary wheel 62 to be manually rotated as a result of a user pushing on the first handle 42 or another user interface 40 to push the patient transport apparatus 10 in a desired direction. In other words, the motor 80 may be unbraked and capable of being driven manually.

It should be appreciated that the terms forward and backward are used to describe opposite directions that the auxiliary wheel 62 rotates to move the base 14 along the floor surface. For instance, forward refers to movement of the patient transport apparatus 10 with the foot end leading and backward refers to the head end leading. In some embodiments, backward rotation moves the patient transport apparatus 10 in the direction with the foot end leading and forward rotation moves the patient transport apparatus 10 in the direction with the head end leading. In such embodiments, the handles 42, 44 may be located at the foot end.

Referring to FIG. 6, the location of the throttle 128 relative to the first handle 42 permits the user to simultaneously grasp the handle body 48 of the first handle 42 and rotate the throttle 128 about the central axis C defined by the inner support 46. This allows the user interface sensor 132, which is operatively attached to the handle body 48 in the illustrated embodiment, to generate the signal responsive to touch by the user while the user moves the throttle 128. In some embodiments, the throttle 128 comprises one or more throttle interfaces (e.g., ridges, raised surfaces, grip portions, etc.) for assisting the user with rotating the throttle 128.

In some embodiments, the throttle assembly 130 may comprise one or more auxiliary user interface sensors 140 (shown in phantom), in addition to the user interface sensor 132, to determine engagement by the user. In the embodiment illustrated in FIG. 6, the auxiliary user interface sensors 140 are realized as throttle interface sensors respectively coupled to each of the throttle interfaces and operatively coupled to the auxiliary wheel drive system 78 (e.g., via electrical communication). The throttle interface sensors are likewise configured to determine engagement by the user and generate a signal responsive to touch of the user's thumb and/or fingers. When the user is touching one or more of the throttle interfaces, the throttle interface sensors generate a signal indicating the user is currently touching one or more of the throttle interfaces and movement of the throttle 128 is permitted to cause rotation of the auxiliary wheel 62. When the user is not touching any of the throttle interfaces, the throttle interface sensors generate a signal indicating an absence of the user's thumb and/or fingers on the throttle interfaces and movement of the throttle 128 is restricted from causing rotation of the auxiliary wheel 62. The throttle interface sensors mitigate the chances for inadvertent contact with the throttle 128 to unintentionally cause rotation of the auxiliary wheel 62. The throttle interface sensors may be absent in some embodiments. As is described in greater detail below in connection with FIG. 6, other types of auxiliary user interface sensors 140 are contemplated by the present disclosure besides the throttle interface sensors described above. Furthermore, it will be appreciated that certain embodiments may comprise both the user interface sensor 132 and the auxiliary user interface sensor 140 (e.g., one or more throttle interface sensors), whereas some embodiments may comprise only one of either the user interface sensor 132 and the auxiliary user interface sensor 140. Various visual indicators 142 (e.g., LEDs, displays, illuminated surfaces, etc.) may also be present on the throttle 128 or the handle body 48 to indicate a current operational mode, speed, state (deployed/retracted), condition, etc. of the auxiliary wheel assembly 60. Other configurations are contemplated.

Referring again to FIGS. 7A-7F, various positions of the throttle 128 are shown. The throttle 128 is movable relative to the first handle 42 to a first throttle position, a second throttle position, and intermediate throttle positions therebetween. The throttle 128 is operable between the first throttle position and the second throttle position to adjust the rotational speed of the auxiliary wheel.

In some embodiments, the first throttle position corresponds with the neutral throttle position N (shown in FIGS. 7A and 7D) and the auxiliary wheel 62 is at rest. The second throttle position corresponds with a maximum forward throttle position 148 (shown in FIG. 7C) of the throttle 128 moved in the first direction 136. One intermediate throttle position corresponds with an intermediate forward throttle position 150 (shown FIG. 7B) of the throttle 128 between the neutral throttle position N and the maximum forward throttle position 148. Here, both the maximum forward throttle position 148 and the intermediate forward throttle position 150 may also be referred to as forward throttle positions.

In other cases, the second throttle position corresponds with a maximum backward throttle position 152 (shown in FIG. 7F) of the throttle 128 moved in the second direction 138. Here, one intermediate throttle position corresponds with an intermediate backward throttle position 154 (shown in FIG. 7E) of the throttle 128 between the neutral throttle position N and the maximum backward throttle position 152. Here, both the maximum backward throttle position 152 and the intermediate backward throttle position 154 may also be referred to as backward throttle positions.

In the embodiments shown, the throttle 128 is movable from the neutral throttle position N to one or more operating throttle positions 146 between, and including, the maximum backward throttle position 152 and the maximum forward throttle position 148, including a plurality of forward throttle positions between the neutral throttle position N and the maximum forward throttle position 148 as well as a plurality of backward throttle positions between the neutral throttle position N and the maximum backward throttle position 152. The configuration of the throttle 128 and the throttle assembly 130 will be described in greater detail below.

Figure 8:
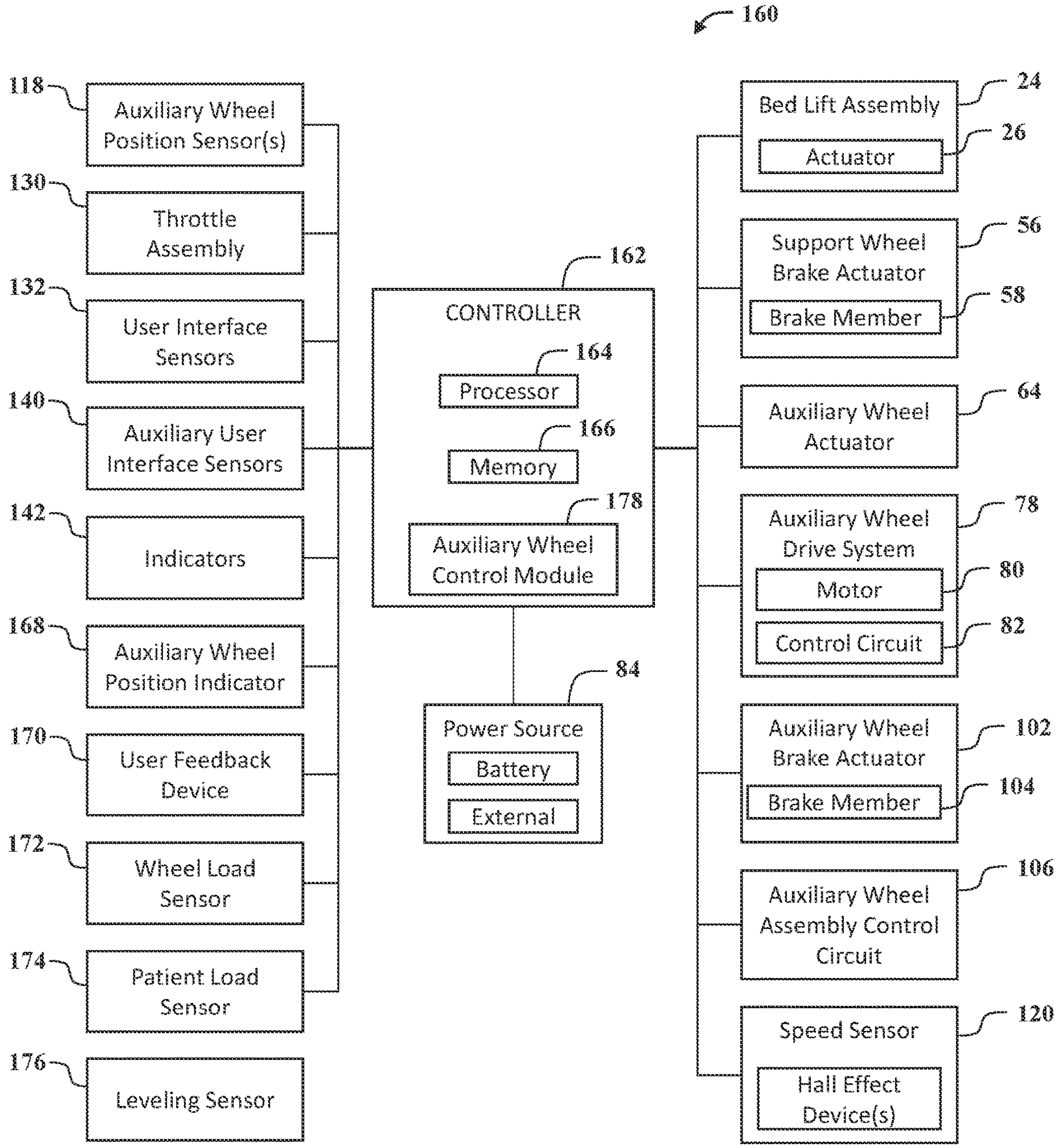
FIG. 8 is a schematic view of a control system of the patient support apparatus shown in FIG. 1.

FIG. 8 illustrates a control system 160 of the patient transport apparatus 10. The control system 160 comprises a controller 162 coupled to, among other components, the user interface sensors 132, the throttle assembly 130, the auxiliary interface sensors 140, the auxiliary wheel assembly control circuit 106, the auxiliary wheel actuator 64, the auxiliary wheel drive system 78, the support wheel brake actuator 56, the auxiliary wheel brake actuator 102, and the lift assembly 24.

The controller 162 is configured to operate the auxiliary wheel actuator 64 and the auxiliary wheel drive system 78. The controller 162 may also be configured to operate the support wheel brake actuator 56, the bed lift actuator 26 to operate the lift assembly 24, and the auxiliary wheel brake actuator 102. The controller 162 is generally configured to detect the signals from the sensors and may be further configured to operate the auxiliary wheel actuator 64 responsive to the user interface sensor 132 generating signals responsive to touch.

The controller 162 comprises one or more microprocessors 164 that are coupled to a memory device 166. The memory device 166 may be any memory device suitable for storage of data and computer-readable instructions. For example, the memory device 166 may be a local memory, an external memory, or a cloud-based memory embodied as random access memory (RAM), non-volatile RAM (NVRAM), flash memory, or any other suitable form of memory.

The one or more microprocessors 164 are programmed for processing instructions or for processing algorithms stored in memory 166 to control operation of patient transport apparatus 10. For example, the one or more microprocessors 164 may be programmed to control the operation of the auxiliary wheel assembly 60, the support wheel brake actuator 56, and the lift assembly 24 based on user input received via the user interfaces 40. Additionally or alternatively, the controller 162 may comprise one or more microcontrollers, field programmable gate arrays, systems on a chip, discrete circuitry, and/or other suitable hardware, software, or firmware that is capable of carrying out the functions described herein. For example, in some embodiments, the instructions and/or algorithms executed by the controller 162 may be performed in a state machine configured to execute the instructions and/or algorithms. The controller 162 may be carried on-board the patient transport apparatus 10, or may be remotely located. In some embodiments, the controller 162 may be mounted to the base 14.

The controller 162 comprises an internal clock to keep track of time. In some embodiments, the internal clock may be realized as a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both.

In some embodiments, the memory 166, microprocessors 164, and microcontroller clock cooperate to send signals to and operate the lift assembly 24 and the auxiliary wheel assembly 60 to meet predetermined timing parameters. These predetermined timing parameters are discussed in more detail below and are referred to as predetermined durations.

The controller 162 may comprise one or more subcontrollers configured to control the lift assembly 24 and the auxiliary wheel assembly 60, or one or more subcontrollers for each of the actuators 26, 56, 64, 102, or the auxiliary wheel drive system 78. In some cases, one of the subcontrollers may be attached to the intermediate frame 16 with another attached to the base 14. Power to the actuators 26, 56, 64, 102, the auxiliary wheel drive system 78, and/or the controller 162 may be provided by a battery power supply.

The controller 162 may communicate with auxiliary wheel assembly control circuit 106, the actuators 26, 56, 64, 102, and the auxiliary wheel drive system 78 via wired or wireless connections. The controller 162 generates and transmits control signals to the auxiliary wheel assembly control circuit 106, the actuators 26, 56, 64, 102, and the auxiliary wheel drive system 78, or components thereof, to operate the auxiliary wheel assembly 60 and lift assembly 24 to perform one or more desired functions.

In some embodiments, and as is shown in FIG. 8, the control system 160 comprises an auxiliary wheel position indicator 168 to display a current position of the auxiliary wheel 62 between or at the deployed position 66 and the retracted position 68, and the one or more intermediate positions. In some embodiments, the auxiliary wheel position indicator 168 comprises a light bar that lights up completely when the auxiliary wheel 62 is in the deployed position 66 to indicate to the user that the auxiliary wheel 62 is ready to be driven. Likewise, the light bar may be partially lit up when the auxiliary wheel 62 is in a partially retracted position and the light bar may be devoid of light when the auxiliary wheel 62 is in the fully retracted position 68. Other visualization schemes are possible to indicate the current position of the auxiliary wheel 62 to the user, such as other graphical displays, text displays, and the like. Such light indicators or displays are coupled to the controller 162 to be controlled by the controller 162 based on the detected position of the auxiliary wheel 62 as described below. Such indicators may be located on the handle 42 or any other suitable location.

In the illustrated embodiment, the control system 160 comprises a user feedback device 170 coupled to the controller 162 to indicate to the user one of a current speed, a current range of speeds, a current throttle position, and a current range of throttle positions. The user feedback device 170 may be similar to the visual indicators 142 described above, and also provide feedback regarding a current operational mode, current state, condition, etc. of the auxiliary wheel assembly 60. The user feedback device 170 may be placed at any suitable location on the patient transport apparatus 10. In some embodiments, the user feedback device 170 comprises one of a visual indicator, an audible indicator, and a tactile indicator.

The actuators 26, 56, 64, 102 and the auxiliary wheel drive system 78 described above may comprise one or more of an electric actuator, a hydraulic actuator, a pneumatic actuator, combinations thereof, or any other suitable types of actuators, and each actuator may comprise more than one actuation mechanism. The actuators 26, 56, 64, 102 and the auxiliary wheel drive system 78 may comprise one or more of a rotary actuator, a linear actuator, or any other suitable actuators. The actuators 26, 56, 64, 102 and the auxiliary wheel drive system 78 may comprise reversible DC motors, or other types of motors. A suitable actuator for the auxiliary wheel actuator 64 comprises a linear actuator supplied by LINAK A/S located at Smedevenget 8, Guderup, DK-6430, Nordborg, Denmark. It is contemplated that any suitable actuator capable of deploying the auxiliary wheel 62 may be utilized.

The controller 162 is generally configured to operate the auxiliary wheel actuator 64 to move the auxiliary wheel 62 to the deployed position 66 responsive to detection of the signal from the user interface sensor 132. When the user touches the first handle 42, the user interface sensor 132 generates a signal indicating the user is touching the first handle 42 and the controller operates the auxiliary wheel actuator 64 to move the auxiliary wheel 62 to the deployed position 66. In some embodiments, the controller 162 is further configured to operate the auxiliary wheel actuator 64 to move the auxiliary wheel 62 to the retracted position 68 responsive to the user interface sensor 132 generating a signal indicating the absence of the user touching the first handle 42.

In some embodiments, the controller 162 is configured to operate the auxiliary wheel actuator 64 to move the auxiliary wheel 62 to the deployed position 66 responsive to detection of the signal from the user interface sensor 132 indicating the user is touching the first handle 42 for a first predetermined duration greater than zero seconds. Delaying operation of auxiliary wheel actuator 64 for the first predetermined duration after the controller 162 detects the signal from the sensor 132 indicating the user is touching the first handle 42 mitigates chances for inadvertent contact to result in operation of the auxiliary wheel actuator 64. In some embodiments, the controller 162 is configured to initiate operation of the auxiliary wheel actuator 64 to move the auxiliary wheel 62 to the deployed position 66 immediately after (e.g., less than 1 second after) the user interface sensor 132 generates the signal indicating the user is touching the first handle 42.

In some embodiments, the controller 162 is further configured to operate the auxiliary wheel actuator 64 to move the auxiliary wheel 62 to the retracted position 68, or to the one or more intermediate positions, responsive to the user interface sensor 132 generating a signal indicating the absence of the user touching the first handle 42. In some embodiments, the controller 162 is configured to operate the auxiliary wheel actuator 64 to move the auxiliary wheel 62 to the retracted position 68, or to the one or more intermediate positions, responsive to the user interface sensor 132 generating the signal indicating the absence of the user touching the first handle 42 for a predetermined duration greater than zero seconds. In some embodiments, the controller 162 is configured to initiate operation of the auxiliary wheel actuator 64 to move the auxiliary wheel 62 to the retracted position 68, or to the one or more intermediate positions, immediately after (e.g., less than 1 second after) the user interface sensor 132 generates the signal indicating the absence of the user touching the first handle 42.

In embodiments including the support wheel brake actuator 56 and/or the auxiliary wheel brake actuator 102, the controller 162 may also be configured to operate one or both brake actuators 56, 102 to move their respective brake members 58, 104 between the braked position and the released position. In some embodiments, the controller 162 is configured to operate one or both brake actuators 56, 102 to move their respective brake members 58, 104 to the braked position responsive to the user interface sensor 132 generating the signal indicating the absence of the user touching the first handle 42 for a predetermined duration. In some embodiments, the predetermined duration for moving brake members 58, 104 to the braked position is greater than zero seconds. In some embodiments, the controller 162 is configured to initiate operation of one or both brake actuators 56, 102 to move their respective brake members 58, 104 to the braked position immediately after (e.g., less than 1 second after) the user interface sensor 132 generates the signal indicating the absence of the user touching the first handle 42.

The controller 162 is configured to operate one or both brake actuators 56, 102 to move their respective brake members 58, 104 to the released position responsive to the user interface sensor 132 generating the signal indicating the user is touching the first handle 42 for a predetermined duration. In some embodiments, the predetermined duration for moving brake members 58, 104 to the released position is greater than zero seconds. In some embodiments, the controller 162 is configured to initiate operation of one or both brake actuators 56, 102 to move their respective brake members 58, 104 to the released position immediately after (e.g., less than 1 second after) the user interface sensor 132 generates the signal indicating the user is touching the first handle 42.

In some embodiments, the auxiliary wheel position sensor 118 (also referred to as a "position sensor") is coupled to the controller 162 and generates signals detected by the controller 162. The auxiliary wheel position sensor 118 is coupled to the controller 162 and the controller 162 is configured to detect the signals from the auxiliary wheel position sensor 118 to detect positions of the auxiliary wheel 62 as the auxiliary wheel 62 moves between the deployed position 66, the one or more intermediate positions, and the retracted position 68.

In some embodiments, the controller 162 is configured to operate one or both brake actuators 56, 102 to move their respective brake members 58, 104 to the released position responsive to detection of the auxiliary wheel 62 being in the deployed position 66. In some embodiments, the controller 162 is configured to operate one or both brake actuators 56, 102 to move their respective brake members 58, 104 to the released position responsive to detection of the auxiliary wheel 62 being in a position between the deployed position 66 and the retracted position 68 (e.g., the one or more intermediate positions).

In some embodiments, an auxiliary wheel load sensor 172 is coupled to the auxiliary wheel 62 and the controller 162, with the auxiliary wheel load sensor 172 configured to generate a signal responsive to a force of the auxiliary wheel 62 being applied to the floor surface. In some embodiments, the auxiliary wheel load sensor 172 is coupled to the axle of the auxiliary wheel 62. The controller 162 is configured to detect the signal from the auxiliary wheel load sensor 172 and, in some embodiments, is configured to operate the auxiliary wheel drive system 78 to drive the auxiliary wheel 62 and move the base 14 relative to the floor surface responsive to the controller 162 detecting signals from the auxiliary wheel load sensor 172 indicating the auxiliary wheel 62 is in the partially deployed position engaging the floor surface when a force of the auxiliary wheel 62 on the floor surface exceeds an auxiliary wheel load threshold. This allows the user to drive the auxiliary wheel 62 before the auxiliary wheel 62 reaches the fully deployed position without the auxiliary wheel 62 slipping against the floor surface.

In some embodiments, a patient load sensor 174 is coupled to the controller 162 and to one of the base 14 and the intermediate frame 16. The patient load sensor 174 generates a signal responsive to weight, such as a patient being disposed on the base 14 and/or the intermediate frame 16. The controller 162 is configured to detect the signal from the patient load sensor 174. Here, the auxiliary wheel load threshold may change based on detection of the signal generated by the patient load sensor 174 to compensate for changes in weight disposed on the intermediate frame 16 and/or the base 14 to mitigate probability of the auxiliary wheel 62 slipping when the controller 162 operates the auxiliary wheel drive system 78.

In some embodiments, a patient transport apparatus leveling sensor 176 is coupled to the controller 162 and to one of the base 14 and the intermediate frame 16. The leveling sensor 176 generates a signal responsive to the horizontal orientation of the base 14. The controller 162 is configured to detect the horizontal orientation of the patient transport apparatus 10 based on signals received from the leveling sensor 176 and determine whether the patient transport apparatus 10 is positioned on a ramp, an inclined floor surface, a declined floor surface, and/or a substantially flat floor surface.

Each of the sensors described above may comprise one or more of a force sensor, a load cell, a speed radar, an optical sensor, an electromagnetic sensor, an accelerometer, a potentiometer, an infrared sensor, a capacitive sensor, an ultrasonic sensor, a limit switch, a level sensor, a 3-Axis orientation sensor, or any other suitable sensor for performing the functions recited herein. Other configurations are contemplated.

In the illustrated embodiments, where the auxiliary wheel drive system 78 comprises the motor 80 and the gear train 94, the controller 162 is configured to operate the motor 80 to drive the auxiliary wheel 62 and move the base 14 relative to the floor surface responsive to detection of the auxiliary wheel 62 being in the at least partially deployed position as detected by virtue of the controller 162 detecting the motor 80 drawing electrical power from the power source 84 above an auxiliary wheel power threshold, such as by detecting a change in current draw of the motor 80 associated with the auxiliary wheel 62 being in contact with the floor surface. In this case, detection of the current drawn by the motor 80 being above a threshold operates as a form of auxiliary wheel load sensor 172.

In some embodiments, when power is not supplied to the motor 80 from the power source 84, the motor 80 acts as a brake to decelerate the auxiliary wheel 62 through the gear train 94. In some embodiments, the auxiliary wheel 62 is permitted to rotate relatively freely when power is not supplied to the motor 80.

FIGS. 11-14 are flow charts of methods 200, 300, 400, and 500 illustrating algorithms that may be executed by the controller 162 to operate the auxiliary wheel assembly 60. The methods include a plurality of steps. Each method step may be performed independently of, or in combination with, other method steps. Portions of the methods may be performed by any one of, or any combination of, the components of the controller 162 and/or the auxiliary wheel assembly control circuit 106. In some embodiments, the controller 162 may include an auxiliary wheel control module 178 that is configured to execute one more of the algorithms illustrated in methods 200-500. In addition, the auxiliary wheel control module 178 may be configured to operate the auxiliary wheel assembly control circuit 106 to perform one or more of the algorithm steps illustrated in methods 200-500. In some embodiments, the auxiliary wheel control module 178 may include a state machine configured to execute the steps illustrated in methods 200-500. In some embodiments, the auxiliary wheel control module 178 may include computer-executable instructions that are stored in the memory device 166 and cause one or more processors 164 of the controller 162 to execute the algorithm steps illustrated in methods 200-500.

In the illustrated embodiment, the controller 162 is programmed to execute the algorithm illustrated in methods 200, 300, 400, and 500 for operating the auxiliary wheel assembly 60 in a plurality of operating modes. For example, the controller 162 may be programmed to operate the auxiliary wheel assembly 60 in a drive mode, a free wheel mode, a coast mode, a free wheel speed limiting mode, and a drag mode. The controller 162 may also be programmed to quickly turn the modes on/off and quickly toggle between modes in certain scenarios. For example, the controller 162 may quickly toggle between the free wheel mode (e.g., used for manually pushing in certain situations) and the drag mode (e.g., used for braking in certain situations). The controller 162 may also quickly toggle between the drive mode (e.g., used for active driving) and the coast mode (e.g., used to come to a gradual stop). The controller 162 may quickly toggle between any two or more of the various modes.

When operating the auxiliary wheel assembly 60 in the drive mode, the controller 162 is programmed to operate the auxiliary wheel assembly control circuit 106 to generate power and control signals to operate the auxiliary wheel drive system 78 to rotate the auxiliary wheel 62 at a desired rotational speed and rotational direction based on user input received from the user interface 40. The controller 162 may receive signals from the throttle assembly 130 indicating the operating throttle positions 146 of the throttle 128 detected by the throttle assembly 130, and operate the auxiliary wheel drive system 78 to rotate the auxiliary wheel 62 at a desired rotational speed and rotational direction associated with the detected operating throttle positions 146. For example, in some embodiments, the controller 162 may be programmed to operate the auxiliary wheel assembly control circuit 106 to generate one or more pulse-width modulated (PWM) signals that are transmitted to the motor control circuit 82 for operating the plurality of FET switches 88 to control the speed and direction of the motor 80. The PWM signals are generated by the auxiliary wheel assembly control circuit 106 to operate the FET switches 88 between "on" and "off" positions to control the rotational speed and direction of the motor 80 and the auxiliary wheel 62. Other variable motor control methods are also contemplated, including those based on output signals other than PWM signals.

When operating the auxiliary wheel assembly 60 in the free wheel mode, the controller 162 is programmed to operate the auxiliary wheel assembly control circuit 106 to operate the auxiliary wheel drive system 78 to enable the auxiliary wheel 62 to rotate relatively freely (non-driving mode). The free wheel mode is available upon start-up (e.g., initially after the auxiliary wheel 62 is at least partially deployed or is fully deployed and before operating in the drive mode) and after ceasing operation in the drive mode or drag mode and detecting that the auxiliary wheel 62 is no longer rotating for at least a predetermined duration as described further below. The free wheel mode may also be available in response to user input (e.g., via a button, sensor, etc. on the handle 42) or anytime the controller 162 determines that the user wishes to manually push the patient transport apparatus 10 vs. actively drive the patient transport apparatus 10. In the free wheel mode, for example, the controller 162 may operate the auxiliary wheel assembly control circuit 106 to control the FET switches 88 to operate the motor control circuit 82 to disconnect the motor leads 92 from the power source 84 (e.g., leaving the FET switches 88 open). In some embodiments, the controller 162 may operate the auxiliary wheel assembly control circuit 106 to transmit a zero PWM signal to the FET switches 88 to operate the auxiliary wheel drive system 78 in the free wheel mode. In some embodiments, the controller 162 may be programmed to operate the auxiliary wheel assembly control circuit 106 to operate the override switch 122 to an "open" position to disconnect the motor 80 from the power source 84 to enable the auxiliary wheel 62 to rotate relatively freely in the free wheel mode.

The coast mode may occur after the user has released the throttle 128 thereby ceasing the drive mode but has maintained contact with the handle 42 (e.g., as indicated by a signal from the user interface sensors 132 and/or the throttle interface sensors). In the coast mode, the controller 162 is programmed to operate the auxiliary wheel assembly control circuit 106 to operate the auxiliary wheel drive system 78 to enable the auxiliary wheel 62 to rotate relatively freely by allowing the auxiliary wheel 62 to come to rest by virtue of the inertia of the patient transport apparatus 10, e.g., without any controlled deceleration or dynamic braking of the motor 80. For example, in some embodiments, the controller 162 may operate the auxiliary wheel assembly control circuit 106 to control the FET switches 88 to operate the motor control circuit 82 to disconnect the motor leads 92 from the power source 84 in the coast mode. In some embodiments, the controller 162 may operate the auxiliary wheel assembly control circuit 106 to transmit a zero PWM signal to the FET switches 88 to operate the auxiliary wheel drive system 78 in the coast mode. In some embodiments, the controller 162 may be programmed to operate the auxiliary wheel assembly control circuit 106 to operate the override switch 122 to an "open" position to disconnect the motor 80 from the power source 84 to enable the auxiliary wheel 62 to rotate relatively freely in the coast mode. In some embodiments, the coast mode, unlike the free wheel mode, may be triggered by releasing of the throttle 128, whereas the free wheel mode may be unavailable until the controller 162 first brakes the auxiliary wheel 62 in the drag mode and then determines that the auxiliary wheel 62 is no longer moving at or above a threshold rotational speed for a predetermined duration to ensure that the patient transport apparatus 10 is not located on a slope (incline/decline).

The controller 162 may also be programmed to operate the auxiliary wheel drive system 78 in the free wheel speed limiting mode to limit the rotational speed of the auxiliary wheel 62. For example, the controller 162 may be programmed to monitor the current rotational speed of the auxiliary wheel 62 with the auxiliary wheel drive system 78 being operated in the free wheel mode, and change operation of the auxiliary wheel drive system 78 to the free wheel speed limiting mode upon determining the current rotational speed is greater than a predefined rotational speed (e.g., to keep the speed at or below a maximum limit). When operating in the free wheel speed limiting mode, the controller 162 may be programmed to operate the auxiliary wheel assembly control circuit 106 to generate and transmit PWM signals to the motor control circuit 82 to limit the maximum rotational speed of the auxiliary wheel 62. In some versions this can be accomplished by active speed control in which the PWM signal is selected to effectively decelerate the patient transport apparatus 10. The free wheel speed limiting mode is particularly helpful when the user is pushing the patient transport apparatus 10 manually in the free wheel mode and encounters a slope/ramp and expects the auxiliary wheel assembly 60 to assist with braking in the event the patient transport apparatus 10 begins to travel too fast. Otherwise, the patient transport apparatus 10 may roll down the slope/ramp more quickly than the user is expecting. By capping the maximum speed during the free wheel mode, the processor 164 provides for a controlled descent down the slope/ramp.

In some versions, controlled deceleration in the free wheel speed limiting mode can be accomplished by disconnecting the motor leads 92 from the power supply and connecting the motor 80 to a variable resistor and/or by operating the FET switches 88 to limit the maximum rotational speed of the auxiliary wheel 62, e.g., by dynamic braking or reverse braking. For example, in some embodiments, the controller 162 may be programmed to operate the auxiliary wheel assembly control circuit 106 to operate the motor control circuit 82 to utilize back electromotive force (back EMF) on the motor 80 to limit the maximum rotational speed of the auxiliary wheel 62 by shorting the motor leads 92 together (e.g., by selectively opening and closing two low side FETs or two high side FETs to short the motor 80). The controller 162 may be programmed to change operation of the auxiliary wheel drive system 78 from the free wheel mode (or coast mode) to the free wheel speed limiting mode automatically based on the monitored rotation of the auxiliary wheel 62 and without input from the user via the user interfaces 40.

The controller 162 is also programmed to operate the auxiliary wheel drive system 78 in the drag mode to limit rotation of the auxiliary wheel 62. When operating the auxiliary wheel assembly 60 in the drag mode, the controller 162 may be programmed to operate the auxiliary wheel assembly control circuit 106 to operate the auxiliary wheel drive system 78 to cause dynamic braking or reverse braking of the motor 80 to resist rotation of the auxiliary wheel 62. This may be useful, for example, when the patient transport apparatus 10 is located on a slope/ramp and the user releases the handle 42. The drag mode could provide for a controlled descent down the slope/ramp.

In some embodiments, the auxiliary wheel assembly control circuit 106 may operate the motor control circuit 82 to utilize back EMF on the motor 80 to operate the auxiliary wheel drive system 78 in the drag mode. In some embodiments, the auxiliary wheel assembly control circuit 106 may operate the motor control circuit 82 to utilize back EMF by shorting the motor leads 92 together (e.g., by selectively opening/closing two low side FETs or two high side FETs to short the motor 80). In some versions, the motor leads 92 may be disconnected from the power supply and the motor 80 connected to a variable resistor. In some embodiments, the level of back EMF utilized during drag mode creates a higher resistance to rotational movement than the level of back EMF utilized during free wheel speed limiting mode (e.g., depending on the frequency/duration of selectively opening/closing the FETs 88 or the value of resistance employed in the variable resistor). In some cases, the motor leads 92 may be constantly shorted in the drag mode to maximize dynamic braking effects. The level of back EMF utilized during free wheel speed limiting mode is adapted to limit the maximum rotation of the auxiliary wheel 62 while still allowing some free wheel mode-based rotation of the auxiliary wheel 62 below the maximum rotational speed, whereas the level of back EMF utilized during drag mode is greater and may be adapted to resist any rotation of the auxiliary wheel 62.

In some embodiments, the processor 164 of the controller 162 is programmed to operate the auxiliary wheel assembly 60 based on user commands received via the user interface 40. For example, the processor 164 may be programmed to receive a user command via the user interface 40 to operate the auxiliary wheel drive system 78 in the drive mode with the auxiliary wheel assembly 60 in the deployed position 66 and responsively operate the motor control circuit 82 to transmit power signals to the motor 80 to rotate the auxiliary wheel 62. For example, in some embodiments, the user interface 40 may include the throttle assembly 130 positionable between the neutral throttle position N and one or more operating throttle positions 146. The processor 164 may be programmed to operate the wheel drive system 78 in the drive mode upon detecting the throttle assembly 130 in the one or more operating throttle positions 146.

In addition, in some embodiments, the processor 164 is programmed to receive a user command via the user interface 40 to operate the auxiliary wheel drive system 78 in the free wheel mode with the auxiliary wheel assembly 60 in the deployed position 66 and responsively operate the motor control circuit 82 to disconnect the motor 80 from the power source 84 to enable the auxiliary wheel 62 to rotate relatively freely.

The processor 164 may also be programmed to change operation of the auxiliary wheel drive system 78 from the drive mode to the coast mode upon detecting the throttle assembly 130 being moved from the one or more operating throttle positions 146 to the neutral throttle position N. For example, processor 164 may be programmed to detect a movement (e.g., by detecting position) of the throttle 128 from an operating throttle position 146 to the neutral position N, and responsively operate the motor control circuit 82 to disconnect the motor 80 from the power source 84 to enable the auxiliary wheel 62 to rotate relatively freely.

In some embodiments, the processor 164 may be programmed to change operation of the auxiliary wheel drive system 78 from the drive mode to the drag mode upon detecting the throttle assembly 130 being moved from the one or more operating throttle positions 146 to the neutral throttle position N. In some embodiments, the processor 164 may be programmed to employ a controlled deceleration of the auxiliary wheel drive system 78 by actively controlling a speed of the motor 80 according to a stored deceleration profile when the throttle assembly 130 is moved from the one or more operating throttle positions 146 to the neutral throttle position N. Once the patient transport apparatus 10 has stopped or nearly stopped, the processor 164 may allow operation in the free wheel mode, if the auxiliary wheel speed sensor 120 detects little or no motion for a predetermined duration. In other words, the free wheel mode may be unavailable to the user until the patient transport apparatus 10 has ceased operating in the drive mode, has stopped or nearly stopped movement, and is substantially at rest for at least a predetermined duration. In alternative versions, the processor 164 may be programmed to receive the user command to operate the auxiliary wheel drive system 78 in the free wheel mode.

In some embodiments, if the auxiliary wheel assembly 60 includes the auxiliary wheel brake actuator 102, the processor 164 may be programmed to receive a user command to operate the auxiliary wheel drive system 78 to stop a rotation of the auxiliary wheel 62 and responsively transmit power signals to the auxiliary wheel brake actuator 102 to operate the auxiliary wheel brake actuator 102 to decelerate a rotation of the auxiliary wheel 62 to a stop position.

The processor 164 is also programmed to operate the auxiliary wheel drive system 78 in the drive mode to rotate the auxiliary wheel 62 in a forward direction upon detecting movement of the throttle assembly 130 from the neutral throttle position N to the one or more forward throttle positions, and operate the auxiliary wheel drive system 78 in the drive mode to rotate the auxiliary wheel 62 in a backward direction upon detecting movement of the throttle assembly 130 from the neutral throttle position N to the one or more backward throttle positions.

Figure 11:
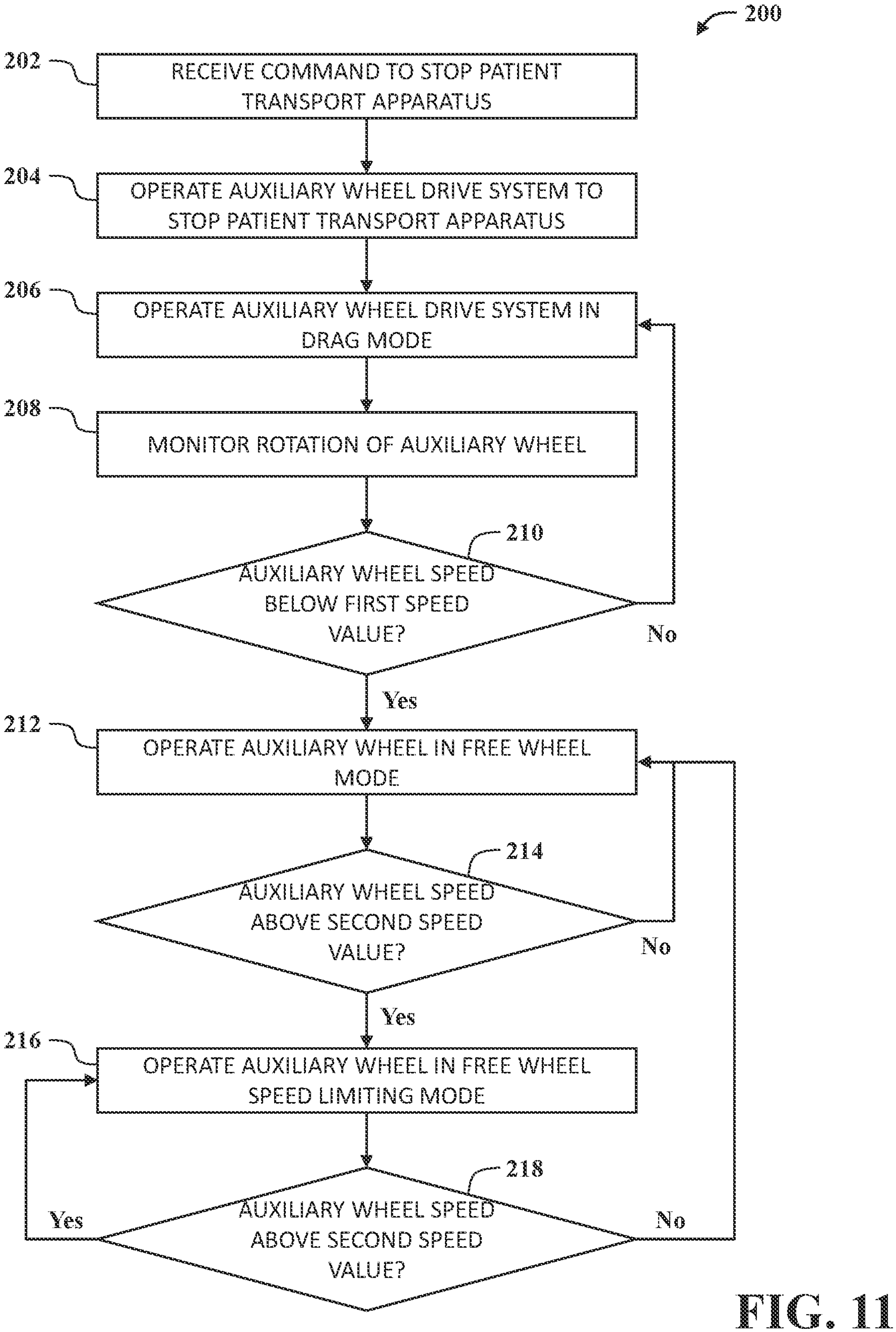
FIGS. 11-14 are flowcharts illustrating various algorithms that may be executed by the control system of the patient support apparatus for operating the auxiliary wheel assembly, according to embodiments of the present disclosure.

Referring to FIG. 11, in some embodiments, the controller 162 is programmed to execute the algorithm illustrated in method 200 for operating the patient transport apparatus. In method steps 202-204, the processor 164 receives a command from the user interface 40 to stop the movement of the patient transport apparatus 10 and operates the auxiliary wheel assembly 60 to decrease the rotation of the auxiliary wheel 62 to stop the patient transport apparatus 10. For example, in some embodiments, the processor 164 may detect a movement of throttle 128 from one of the operating throttle positions 146 to the neutral throttle position N indicating the user releasing the throttle 128 from the operating throttle position 146 and/or moving the throttle 128 from the operating throttle position 146 to the neutral throttle position N. Upon detecting the movement of the throttle 128 from the operating throttle position 146 to the neutral position N, the processor 164 may operate the auxiliary wheel drive system 78 to operate the motor 80 to decelerate the rotation of the auxiliary wheel 62 to a stop position or nearly stopped position and/or operate the auxiliary wheel brake actuator 102 to move the brake member 104 to a braked position to decelerate the rotation of the auxiliary wheel 62 to the stop position or nearly stopped position. The processor 164 may also be programmed to receive signals from the auxiliary wheel speed sensor 120 and monitor the rotation of the auxiliary wheel 62 to determine when the auxiliary wheel 62 has decelerated to a stop position or nearly stopped position.

In method step 206, the processor 164 operates the auxiliary wheel drive system 78 in the drag mode upon determining the auxiliary wheel 62 is in the stop position or the nearly stopped position. For example, in some embodiments, the processor 164 operates the auxiliary wheel drive system 78 in the drag mode by operating the motor control circuit 82 to cause dynamic or reverse braking of the motor 80 to enable braking of the auxiliary wheel 62, as previously described.

In method step 208, the processor 164 then monitors a current rotational speed of the auxiliary wheel 62 with the auxiliary wheel drive system 78 operating in the drag mode. For example, in some embodiments, the control system 160 may include the one or more of the auxiliary wheel speed sensors 120 to sense a rotational speed of the auxiliary wheel 62. The processor 164 receives signals from the auxiliary wheel speed sensor 120 to monitor a current rotational speed of the auxiliary wheel 62 with the auxiliary wheel drive system 78 operating in the drag mode. In some embodiments, the auxiliary wheel speed sensor 120 includes one or more hall effect devices that are configured to sense rotation of the motor 80 (e.g., the motor shaft). The processor 164 monitors signals received from the hall effect devices to detect a rotation of the motor 80 to determine the current rotational speed of the auxiliary wheel 62.

In method step 210, the processor 164 compares the monitored rotational speed of the auxiliary wheel 62 with a first predefined rotational speed value. If the monitored current rotational speed is above, or greater than, the first predefined rotational speed value, the processor 164 continues to operate the auxiliary wheel drive system 78 in the drag mode and monitor the rotational speed of the auxiliary wheel 62. If the monitored current rotational speed is at or below, or equal to or less than, the first predefined rotational speed value, the processor 164 executes method step 212 and changes the operation of the auxiliary wheel drive system 78 from the drag mode to the free wheel mode. In some embodiments, the processor 164 is programmed to change the operation of the auxiliary wheel drive system 78 from the drag mode to the free wheel mode upon determining the monitored current rotational speed is less than or equal to the first predefined rotational speed value for a predefined period of time. For example, the processor 164 may be programmed to change operation from the drag mode to the free wheel mode if the monitored rotational speed is less than or equal to the first predefined rotational speed value for a period of more than 1 second.

In method step 214, the processor 164 monitors a current rotational speed of the auxiliary wheel 62 with the auxiliary wheel drive system 78 in the free wheel mode and compares the monitored rotational speed of the auxiliary wheel 62 with a second predefined rotational speed value. If the monitored current rotational speed is equal to or less than the second predefined rotational speed value, the processor 164 continues to operate the auxiliary wheel drive system 78 in the free wheel mode and monitor the rotational speed of the auxiliary wheel 62.

If the monitored current rotational speed is greater than the second predefined rotational speed value, the processor 164 executes method step 216 and changes the operation of the auxiliary wheel drive system 78 from the free wheel mode to the free wheel speed limiting mode by operating the motor control circuit 82 to transmit power signals to the motor 80 to reduce the current rotational speed of the auxiliary wheel 62. In some embodiments, the processor 164 may return to method step 206 and change operation of the auxiliary wheel drive system 78 from the free wheel mode to the drag mode upon determining the current rotational speed of the auxiliary wheel 62 is greater than the second predefined rotational speed value.

In method step 218, the processor 164 continues to monitor the current rotational speed of the auxiliary wheel 62 with the auxiliary wheel drive system 78 operating in free wheel speed limiting mode and compares the monitored rotational speed with the second predefined rotational speed value. The second predefined rotational speed value is greater than the first predefined rotational speed value and may represent a maximum speed limit for the patient transport apparatus 10 in the free wheel mode. If the monitored current rotational speed is equal to or less than the second predefined rotational speed value, the processor 164 continues to operate the auxiliary wheel drive system 78 in the free wheel mode (method step 212) and monitor the rotational speed of the auxiliary wheel 62. If the monitored current rotational speed is greater than the second predefined rotational speed value, the processor 164 continues to execute method step 216 until the monitored current rotational speed is at or below the second predefined rotational speed value. In some versions (not shown), the processor 164 may change the operation of the auxiliary wheel drive system 78 from the free wheel speed limiting mode to the drag mode to further reduce the current rotational speed.

Figure 12:
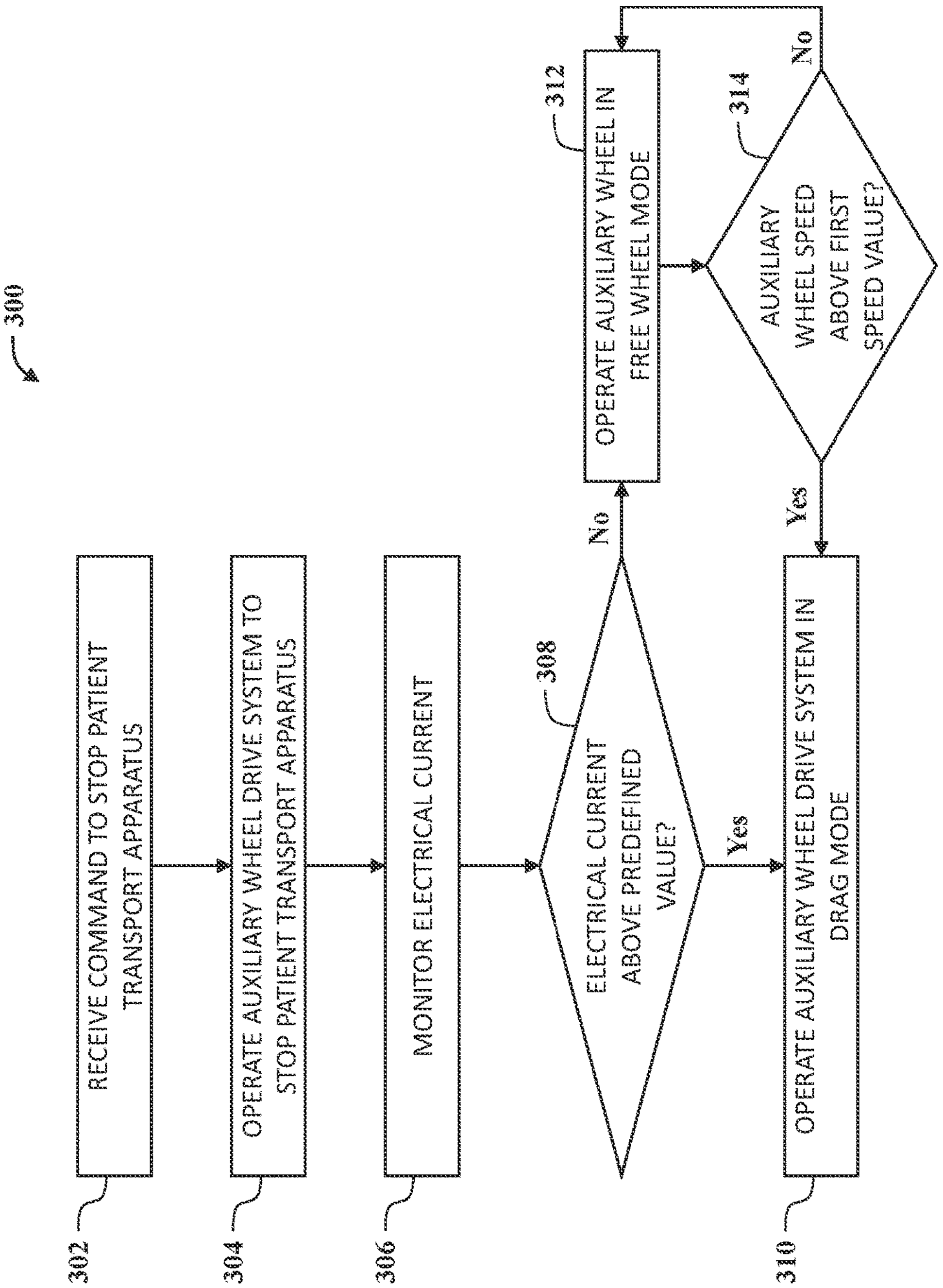

Referring to FIG. 12, in some embodiments, the controller 162 is programmed to execute the algorithm illustrated in method 300 for operating the patient transport apparatus 10. In method steps 302-304, the processor 164 receives a command from the user interface 40 to stop the movement of the patient transport apparatus 10 and operate the auxiliary wheel assembly 60 to decrease the rotation of the auxiliary wheel 62 to stop the patient transport apparatus 10.

In method step 306, the processor 164 is programmed to monitor an electrical current level of power signals drawn by the auxiliary wheel brake actuator 102 and/or the motor control circuit 82 with the auxiliary wheel 62 in the stop position.

In method step 308, the processor compares the monitored electrical current levels with a predefined electrical current value. If the monitored electrical current levels are greater than or equal to the predefined electrical current level, which may indicate that the patient transport apparatus 10 is on a slope/ramp, the processor 164 executes method step 310 and operates the auxiliary wheel drive system 78 in the drag mode (or the free wheel speed limiting mode in some versions) and continues in the drag mode (or free wheel speed limiting mode) until the monitored electrical current levels fall below the predefined electrical current level.

If the monitored electrical current levels are less than the predefined electrical current level, the processor 164 is programmed to execute method step 312 and operate the auxiliary wheel drive system 78 in the free wheel mode.

In method step 314, the processor 164 monitors a current rotational speed of the auxiliary wheel 62 with the auxiliary wheel drive system 78 operating in the free wheel mode and compares the monitored rotational speed with the first predefined rotational speed value. If the monitored rotational speed is greater than the first predefined rotational speed value, the processor executes method step 310 and changes the operation of the auxiliary wheel drive system 78 from the free wheel mode to the drag mode. If the monitored rotational speed is less than or equal to the predefined rotational speed value, the processor 164 continues to operate the auxiliary wheel drive system 78 in the free wheel mode.

Figure 13:
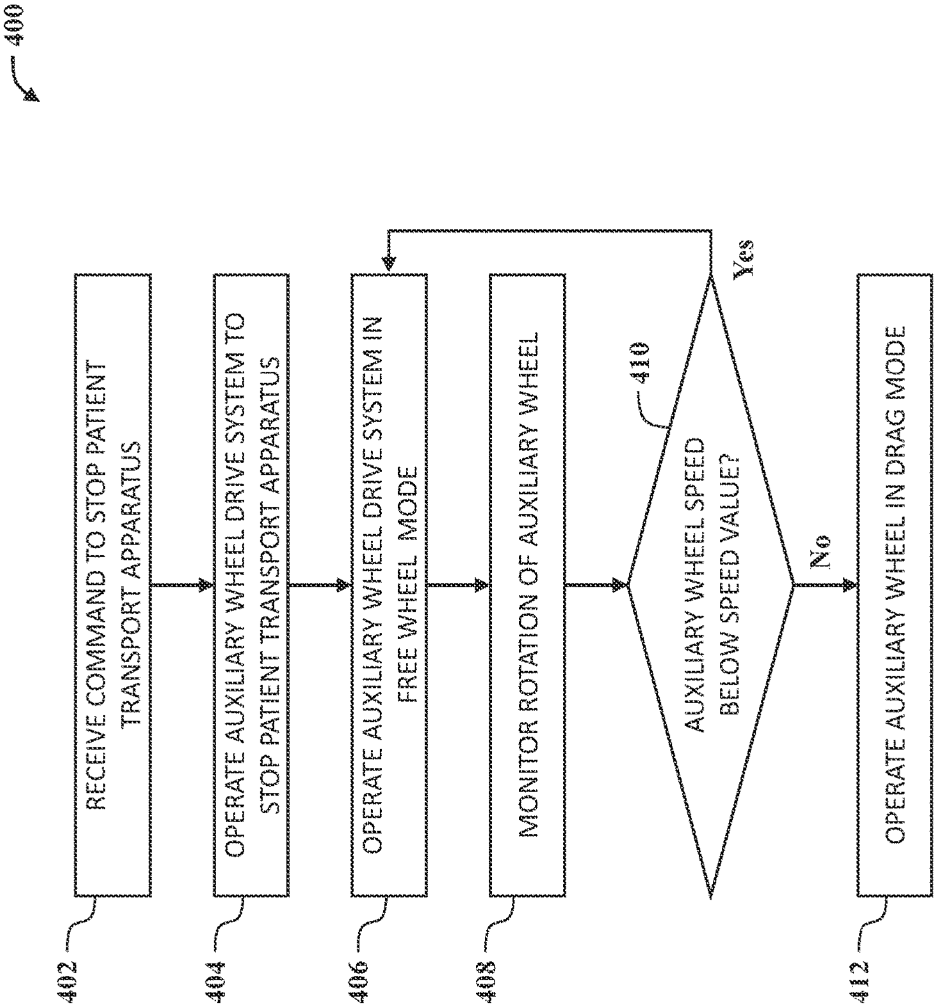

Referring to FIG. 13, in some embodiments, the controller 162 is programmed to execute the algorithm illustrated in method 400 for operating the patient transport apparatus 10. In method steps 402-404, the processor 164 receives a command from the user interface 40 to stop the movement of the patient transport apparatus 10 and operate the auxiliary wheel assembly 60 to decrease the rotation of the auxiliary wheel 62 to stop the patient transport apparatus 10. In some versions, this may include the patient transport apparatus 10 being operated in the coast mode until the patient transport apparatus 10 comes to the stop position.

In method step 406, the processor 164 is programmed to operate the auxiliary wheel drive system 78 in the free wheel mode upon determining the auxiliary wheel 62 is in the stop position.

In method step 408, the processor 164 then monitors a current rotational speed of the auxiliary wheel 62 with the auxiliary wheel drive system 78 operating in the free wheel mode.

In method step 410, the processor 164 is programmed to compare the monitored rotational speed with a first predefined rotational speed value. If the monitored rotational speed is greater than the first predefined rotational speed value, the processor executes method step 412 and changes the operation of the auxiliary wheel drive system 78 from the free wheel mode to the drag mode (or the free wheel speed limiting mode in some versions) and continues in the drag mode (or free wheel speed limiting mode) until the monitored rotational speed falls below the first predefined rotational speed value. If the monitored rotational speed is less than or equal to the predefined rotational speed value, the processor 164 continues to operate the auxiliary wheel drive system 78 in the free wheel mode.

In some embodiments, if the auxiliary wheel assembly 60 includes a leveling sensor 176 (e.g., accelerometer, gyroscope, tilt sensor, etc.) for use in determining if the patient transport apparatus 10 is positioned on a slope/ramp, the processor 164 may be programmed to receive signals from the leveling sensor 176 to monitor a position of the patient transport apparatus 10 and change the operation of the auxiliary wheel drive system 78 to various modes when determining the patient transport apparatus 10 is positioned on a slope/ramp. For example, upon a user's release of the throttle 128 back to the neutral position N, but with their hand still on the handle 42 (as detected by the user interface sensor 132), the processor 164 may use the leveling sensor 176 to determine if the patient transport apparatus 10 is currently traveling up the slope/ramp or down the slope/ramp and the processor 164 may engage different modes accordingly when the user releases the throttle 128. For instance, when traveling up the slope/ramp, the processor 164 may operate the auxiliary wheel assembly 60 in the drag mode upon a release of the throttle 128. However, if the patient transport apparatus 10 is traveling down the slope at the time that the throttle 128 is released, the processor 164 may operate the auxiliary wheel assembly 60 in the free wheel mode or the coast mode, with speed limiting. Other variations of different modes that could be employed are also possible. Other methods of determining whether the patient transport apparatus 10 is traveling up the slope/ramp or down the slope/ramp could also be employed, such as a slope determining circuit that measures current drawn by the motor 80 and compares the current to expected current for a given condition, e.g., slope. For instance, different levels of current are required to maintain a constant speed going up a slope than going down a slope.

Figure 14:
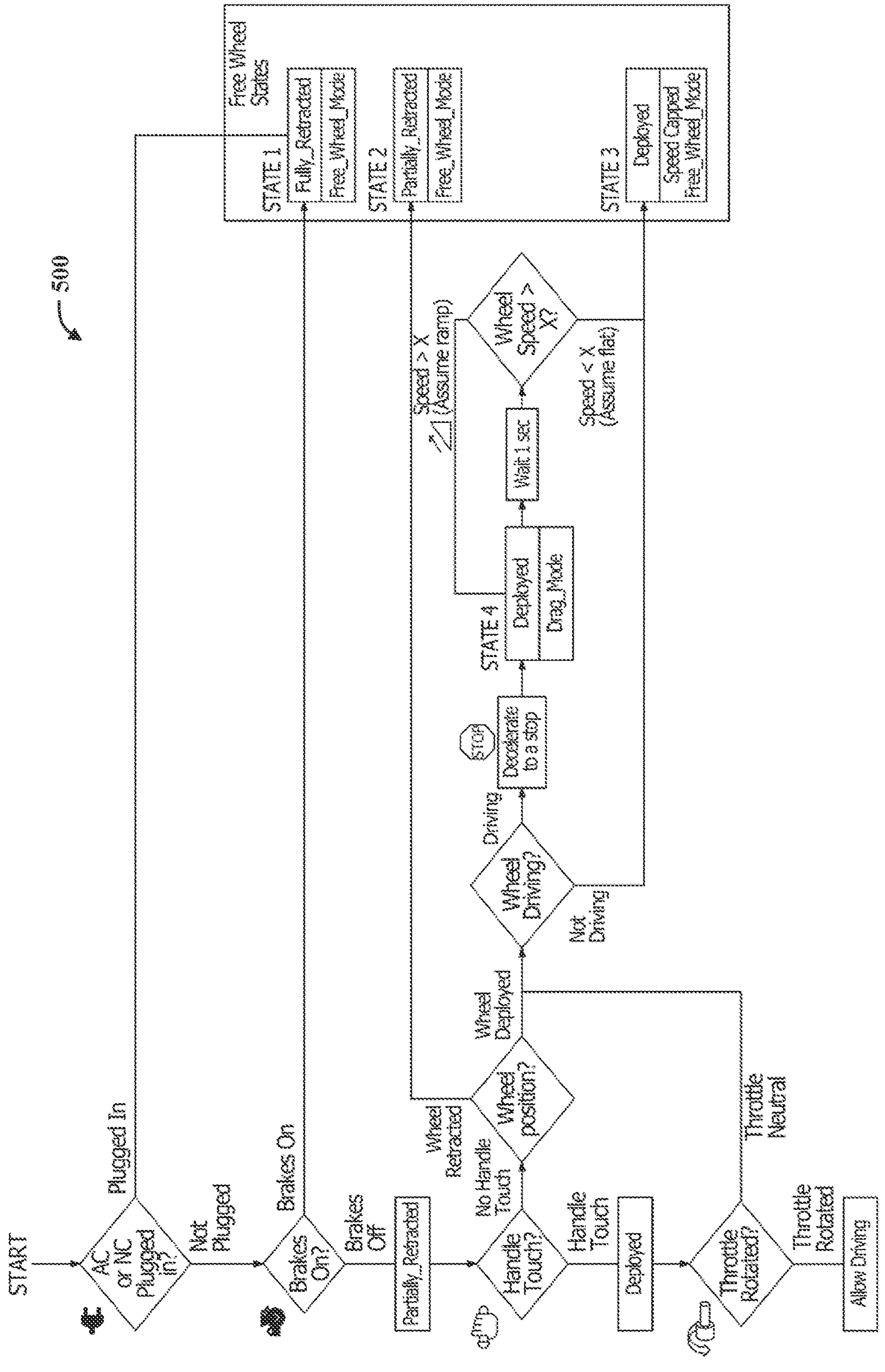

Referring to FIG. 14, in some embodiments, the controller 162 is programmed to execute the algorithm illustrated in method 500 for operating the patient transport apparatus 10. As illustrated in method 500, the processor 164 may be programmed to determine if the battery power supply 84 is being recharged and/or the patient transport apparatus 10 is plugged into an AC circuit (e.g., using external power). If the processor 164 determines the patient transport apparatus 10 is plugged in, the processor 164 operates the auxiliary wheel assembly 60 to a fully retracted position and in the free wheel mode (e.g., disconnects power to the motor 80, which is the default mode when the auxiliary wheel 62 is retracted and not in contact with the floor surface).

It will be appreciated that the auxiliary wheel drive system 78 can be operated in different ways, such as to decrease or otherwise limit the speed of the auxiliary wheel 62 and/or capping current output to the motor 80, based such as on battery charge BC of the power supply 84. Here, the controller 162 may monitor battery charge BC between various thresholds used to control operation of the auxiliary wheel drive system 78. For example, in some embodiments, if the battery charge BC falls within a first battery threshold BT1 (e.g., 60%<BC≤100%), the controller 162 may allow "normal" operation of the auxiliary wheel drive system 78. In some embodiments, if the battery charge BC falls within a second battery threshold BT2 (e.g., 55<BC≤60%), the controller 162 may allow for operation of the auxiliary wheel drive system 78 but with a control loop based on capping current draw, such as to result in reducing speed when going up a ramp, but otherwise operating "normally" on flat surfaces. In some embodiments, if the battery charge BC falls within a third battery threshold BT3 (e.g., 50%<BC≤55%), and if the controller 162 detects that the auxiliary wheel 62 is in the deployed position 66, the controller 162 may allow operation of the auxiliary wheel drive system 78 but with a control loop based on capping current draw. However, in some embodiments, if the battery charge falls within the third battery threshold BT3 and the controller 162 detects that the auxiliary wheel 62 is in the retracted position 68, the controller may not allow the user to deploy the auxiliary wheel 62 (e.g., to prevent the start of utilization without sufficient battery charge BC). In some embodiments, if the battery charge BC falls within a fourth battery threshold BT4 (e.g., 25%<BC≤55%), the controller 162 could operate the auxiliary wheel drive system 78 so as to decelerate to a controlled stop, enter dynamic braking mode and monitor for rotation of the auxiliary wheel 62. Here, if there is no rotation of the auxiliary wheel 62 for a predetermined amount of time (e.g., no rotation detected for more than 1 second). The controller 162 could then enter free wheel mode. Here too, if there is no rotation of the auxiliary wheel 62 for another predetermined amount of time (e.g., no rotation detected for more than 3 seconds), and/or if the controller 162 detects that the handle 42 has been released for a predetermined amount of time (e.g., released for more than 1.5 seconds), then the controller 162 could move the auxiliary wheel 62 to the retracted position 68. It will be appreciated that these examples help ensure that the patient transport apparatus 10 can be operated safely, and will not become "stuck" with the auxiliary wheel 62 in the deployed position 66 while the battery charge BC is too low. In some embodiments, if the battery charge BC falls within a fifth battery threshold BT5 (e.g., BC≤25%), the controller 162 could generally prevent operation of the auxiliary wheel drive system 78, save relevant items to non-volatile memory, and enter a low-power mode. Those having ordinary skill in the art will appreciate that the various battery thresholds BT1, BT2, BT3, BT4, BT5 described above could be defined in various ways, with different ranges other than those used in the examples provided above, without departing from the scope of the present disclosure. Moreover, it will be appreciate that different numbers of thresholds (e.g., more, fewer) could be utilized. Other configurations are contemplated.

In some cases, it may be desirable for the auxiliary wheel assembly 60 to be automatically retracted upon the patient transport apparatus 10 receiving external power (e.g., being plugged into an AC wall outlet). In this case, the processor 164 operates to automatically retract the auxiliary wheel assembly 60 to the fully retracted position upon the control system 160 detecting an AC signal (e.g., wall voltage) from the AC wall outlet. In some versions, it may desirable for the user to cause some movement of the auxiliary wheel assembly 60 even when plugged into an AC wall outlet. In this case, the processor 164 may keep the auxiliary wheel assembly 60 in the deployed state and ready for active driving input from the user.

If the processor 164 determines that the patient transport apparatus 10 is not plugged in, the processor 164 then determines whether the auxiliary wheel brake actuator 102 and/or the support wheel brake actuator 56 are in a braked position. If the processor 164 determines the auxiliary wheel brake actuator 102 and/or the support wheel brake actuator 56 are in the braked position, the processor 164 operates the auxiliary wheel assembly 60 to a fully retracted position and free wheel mode.

In some cases, the processor 164 may automatically retract the auxiliary wheel assembly 60 to the fully retracted position upon detecting actuation of one or more of the brakes (such as by a brake sensor that detects operation of the brakes, e.g., limit switch, optical sensor, hall-effect sensor, etc.). If the processor 164 determines that the auxiliary wheel brake actuator 102 and/or the support wheel brake actuator 56 are not in the braked position, the processor 164 may operate the auxiliary wheel assembly 60 to a partially retracted position. In some cases, the processor 164 may automatically move the auxiliary wheel assembly 60 from the fully retracted position to the partially retracted position upon detecting release of one or more of the brakes (e.g., via the brake sensor). Operation of the brakes to a released position may indicate that the user wishes to move the patient transport apparatus 10, in which case the processor 164 moves the auxiliary wheel 62 to just above the floor surface, so that when the user grabs the handle 42 and activates the user interface sensor 132, the required travel of the auxiliary wheel 62 to the deployed position is minimized.

With continued reference to FIG. 14, the processor 164 also determines whether a handle touch of the user is detected by the user interface 40 (e.g., via the user interface sensor 132). If a handle touch is not detected, the processor 164 then determines/detects the position of the auxiliary wheel 62. If the processor 164 determines/detects the auxiliary wheel assembly 60 to still be in a partially retracted state and in the free wheel mode (such as when the patient transport apparatus 10 is not plugged in and the brakes are released), then the processor 164 maintains the auxiliary wheel assembly 60 in the partially retracted state and in the free wheel mode.

If the processor determines/detects the auxiliary wheel 62 to be in the deployed position 66 with no handle touch detected, the processor 164 may then determine whether the auxiliary wheel 62 was just being actively driven, e.g., did the user recently remove their hand from the throttle 128 and handle 42 and the auxiliary wheel 62 is still moving. If it's determined that the auxiliary wheel 62 was not being actively driven just before detecting no handle touch, e.g., such as when the user has been pushing the patient transport apparatus 10 in the free wheel mode, then the processor 164 may continue to operate the auxiliary wheel assembly 60 in the free wheel mode, subject to speed limits. In other versions, if the user was operating in the free wheel mode and then releases the handle 42, the processor 164 may operate the auxiliary wheel assembly 60 in the drag mode or may fully or at least partially retract the auxiliary wheel 62.

If the auxiliary wheel 62 was being actively driven (e.g., the drive mode was active before the handle 42 was released), then the processor 164 decelerates the auxiliary wheel 62 to a stop position or nearly stopped position and then operates the auxiliary wheel assembly 60 in the drag mode. Such deceleration may be by virtue of active drive control to zero speed, dynamic braking, reverse braking, operating in the coast mode, or the like. The processor 164 thereafter detects the rotation of the auxiliary wheel 62 after a predefined duration (e.g., 1 second). If the detected rotation of the auxiliary wheel 62 is greater than a predefined rotation value, the processor 164 determines the patient transport apparatus 10 is positioned on a slope/ramp and continues to operate the auxiliary wheel assembly 60 in the drag mode. If the detected rotation of the auxiliary wheel 62 is less than or equal to the predefined rotation value, the processor 164 determines the patient transport apparatus 10 is positioned on a substantially level surface and operates the auxiliary wheel assembly 60 in the free wheel mode, subject to speed limits as previously described.

If a handle touch is detected, the processor 164 operates the auxiliary wheel assembly 60 to the deployed position 66 and detects the position of the throttle assembly 130. If the throttle assembly 130 is rotated to an operating throttle position 146, the processor 164 operates the auxiliary wheel assembly 60 in the drive mode based on the detected operating throttle position 146. If the throttle assembly 130 is in the neutral position, the processor 164 then determines if the auxiliary wheel 62 was previously being actively driven (e.g., was the throttle 128 just released or has the user just recently grabbed the handle 42, but not yet actuated the throttle 128). If not previously being actively driven, then the processor 164 operates in the free wheel mode, subject to speed limits. If the auxiliary wheel 62 was previously being actively driven, e.g., the user released the throttle 128, then the processor 164 operates the auxiliary wheel assembly 60 as previously described to first come to the stop position, thereafter enter the drag mode, and subsequently detect movement to determine if the drag mode should be continued or if the patient transport apparatus 10 can be operated in the free wheel mode.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
- a support structure;
- a support wheel coupled to the support structure;
- an auxiliary driver coupled to the support structure to influence motion of the patient transport apparatus over a floor surface, the auxiliary driver being movable between a deployed position engaging the floor surface and a retracted position spaced from the floor surface;
- a drive system including a motor to drive the auxiliary driver, and a motor control circuit for transmitting power signals from a power source to the motor;
- a user interface for receiving user commands from a user to operate the drive system; and
- a control system coupled to the user interface and the drive system for operating the drive system based on user commands received via the user interface, the control system including a processor programmed to, upon determining the auxiliary driver is in a stop position, operate the drive system in one of:
  - a free wheel mode with the auxiliary driver in the deployed position engaging the floor surface, and
  - a drag mode with the auxiliary driver in the deployed position engaging the floor surface;
- wherein the drive system operates the motor control circuit to enable the auxiliary driver to move in each of the free wheel mode and the drag mode and to move with less resistance in the free wheel mode than the drag mode, and operates the motor control circuit to resist movement of the auxiliary driver in the drag mode.

2. The patient transport apparatus of claim 1, wherein the motor control circuit includes a motor bridge circuit including a plurality of field-effect transistor (FET) switches coupled to motor leads of the motor, the processor programmed to control the FET switches to operate the motor control circuit to disconnect the motor leads from the power source in the free wheel mode.

3. The patient transport apparatus of claim 2, wherein the processor is programmed to transmit control signals to the FET switches to operate the drive system in the free wheel mode.

4. The patient transport apparatus of claim 1, further comprising an override switch coupled between the motor and the power source, the override switch being operable in an open position to disconnect the motor from the motor control circuit to enable the auxiliary driver to move in the free wheel mode; and wherein the processor is programmed to operate the override switch to the open position to disconnect the motor from the power source to enable the auxiliary driver to move in the free wheel mode.

5. The patient transport apparatus of claim 1, wherein the control system includes a plurality of sensors configured to sense a speed of the auxiliary driver; and wherein the processor is programmed to:

monitor a current speed of the auxiliary driver with the drive system in the free wheel mode, and operate the drive system in a free wheel speed limiting mode upon determining the current speed is greater than a predefined speed value by operating the motor control circuit to transmit power signals to the motor to reduce the current speed of the auxiliary driver.

6. The patient transport apparatus of claim 1, wherein the processor is programmed to operate the drive system in the free wheel mode with the auxiliary driver in the retracted position.

7. The patient transport apparatus of claim 1, wherein the processor is programmed to operate the drive system in the drag mode by operating the motor control circuit to cause braking of the motor to resist movement of the auxiliary driver.

8. The patient transport apparatus of claim 1, wherein the motor is coupled to the motor control circuit with a plurality of motor leads, the motor control circuit including a motor bridge circuit with a plurality of FET switches coupled to the motor leads; and wherein the processor is programmed to operate the motor bridge circuit to control the plurality of FET switches to utilize back electromotive force (back EMF) on the motor with the drive system in the drag mode by shorting the motor leads together.

9. The patient transport apparatus of claim 1, wherein the processor is programmed to:

monitor a current speed of the auxiliary driver with the drive system operating in the free wheel mode; and change operation of the drive system from the free wheel mode to the drag mode upon determining the current speed is greater than a predefined speed.

10. The patient transport apparatus of claim 1, further comprising a leveling sensor for use in determining if the patient transport apparatus is positioned on a ramp; and wherein the processor is programmed to:

receive signals from the leveling sensor to monitor a position of the patient transport apparatus with the drive system in the free wheel mode; and change operation of the drive system from the free wheel mode to the drag mode upon determining the patient transport apparatus is positioned on a ramp.

11. The patient transport apparatus of claim 1, wherein the processor is programmed to:

operate the drive system in the drag mode upon determining the auxiliary driver is in the stop position;

monitor a current speed of the auxiliary driver with the drive system operating in the drag mode; and change operation of the drive system from the drag mode to the free wheel mode upon determining the current speed is less than a predefined speed value for a predefined period of time.

12. The patient transport apparatus of claim 1, wherein the processor is programmed to:

monitor an electrical current level of the motor control circuit;

operate the drive system in the drag mode upon determining the monitored electrical current level is greater than or equal to a predefined electrical current level; and operate the drive system in the free wheel mode upon determining the monitored electrical current level is less than the predefined electrical current level.

13. The patient transport apparatus of claim 1, wherein the processor is programmed to operate the drive system in the free wheel mode upon determining the auxiliary driver is in the stop position.

14. The patient transport apparatus of claim 1, wherein the user interface includes a throttle assembly positionable between a neutral throttle position and one or more operating throttle positions; and wherein the processor is programmed to operate the drive system in a drive mode to drive the auxiliary driver with the motor upon detecting the throttle assembly in the one or more operating throttle positions.

15. The patient transport apparatus of claim 14, wherein the processor is programmed to change operation of the drive system from the drive mode to the free wheel mode upon detecting the throttle assembly being moved from the one or more operating throttle positions to the neutral throttle position.

16. The patient transport apparatus of claim 14, wherein the processor is programmed to change operation of the drive system from the drive mode to the drag mode upon detecting the throttle assembly being moved from the one or more operating throttle positions to the neutral throttle position.

17. The patient transport apparatus of claim 14, wherein the processor is programmed to change operation of the drive system from the drive mode to a coast mode upon detecting the throttle assembly being moved from the one or more operating throttle positions to the neutral throttle position.

18. The patient transport apparatus of claim 14, wherein the one or more operating throttle positions includes one or more forward throttle positions and one or more backward throttle positions; and wherein the processor is programmed to:

operate the drive system in the drive mode to drive the auxiliary driver in a forward direction upon detecting positioning of the throttle assembly from the neutral throttle position to the one or more forward throttle positions; and operate the drive system in the drive mode to drive the auxiliary driver in a backward direction upon detecting positioning of the throttle assembly from the neutral throttle position to the one or more backward throttle positions.

19. The patient transport apparatus of claim 1, wherein the processor of the control system is further programed to change operation between the drag mode and the free wheel mode while retaining the auxiliary driver in the deployed position engaging the floor surface in response to one or more of:

predetermined changes occurring in user engagement with the user interface, and predetermined changes occurring in speed of the auxiliary driver.

20. The patient transport apparatus of claim 1, further comprising an auxiliary driver actuator coupled to the support structure and supporting the auxiliary driver for movement between the deployed position and the retracted position; and wherein the control system is coupled to the auxiliary driver actuator and the processor is further programed to operate the auxiliary driver actuator to move the auxiliary driver away from the deployed position in response to one or more of:

predetermined changes occurring in user engagement with the user interface, and predetermined changes occurring in speed of the auxiliary driver.

* * * * *